United States Patent
Plaisted et al.

(10) Patent No.: US 8,256,170 B2
(45) Date of Patent: Sep. 4, 2012

(54) RACK ASSEMBLY FOR MOUNTING SOLAR MODULES

(75) Inventors: Joshua Reed Plaisted, Oakland, CA (US); Brian West, San Francisco, CA (US)

(73) Assignee: PVT Solar, Inc., Fremont, CA (US)

( * ) Notice: Subject to any disclaimer, the term of this patent is extended or adjusted under 35 U.S.C. 154(b) by 0 days.

(21) Appl. No.: 12/949,551

(22) Filed: Nov. 18, 2010

(65) Prior Publication Data

US 2011/0174360 A1    Jul. 21, 2011

Related U.S. Application Data

(63) Continuation of application No. 11/332,000, filed on Jan. 13, 2006, now Pat. No. 7,856,769, which is a continuation-in-part of application No. 10/855,254, filed on May 26, 2004.

(60) Provisional application No. 60/544,753, filed on Feb. 13, 2004, provisional application No. 60/643,619, filed on Jan. 13, 2005.

(51) Int. Cl.
    *E04H 14/00*        (2006.01)

(52) U.S. Cl. .................... 52/173.3; 249/219.1; 136/244; 136/251

(58) Field of Classification Search ................. 52/173.3; 249/219.1; 136/244, 251
See application file for complete search history.

(56) References Cited

U.S. PATENT DOCUMENTS

| | | | |
|---|---|---|---|
| 1,159,372 A | 10/1915 | Goff | |
| 2,747,166 A | 5/1956 | Hoffarth | |
| 3,881,799 A | 5/1975 | Elliott et al. | |
| 4,029,080 A * | 6/1977 | Warren | 126/643 |
| 4,061,413 A | 12/1977 | Keller | |
| 4,150,660 A | 4/1979 | Peters et al. | |
| 4,239,555 A | 12/1980 | Scharlack et al. | |
| 4,336,413 A | 6/1982 | Tourneux | |
| 4,372,292 A * | 2/1983 | Ort | 126/622 |
| 4,636,577 A | 1/1987 | Peterpaul | |

(Continued)

FOREIGN PATENT DOCUMENTS

DE       19804685 A1    8/1999

(Continued)

OTHER PUBLICATIONS

Communication Pursuant to Article 94(3) EPC in Application No. 06733720.4-1266, European Patent Office, Jul. 16, 2008, 6 pages.

(Continued)

*Primary Examiner* — Mark Wendell
(74) *Attorney, Agent, or Firm* — Mahamedi Paradice Kreisman LLP

(57) ABSTRACT

A rack assembly is provided for mounting solar modules over an underlying body. The rack assembly may include a plurality of rail structures that are arrangeable over the underlying body to form an overall perimeter for the rack assembly. One or more retention structures may be provided with the plurality of rail structures, where each retention structure is configured to support one or more solar modules at a given height above the underlying body. At least some of the plurality of rail structures are adapted to enable individual rail structures to be sealed over the underlying body so as to constrain air flow underneath the solar modules. Additionally, at least one of (i) one or more of the rail structures, or (ii) the one or more retention structures are adjustable so as to adapt the rack assembly to accommodate solar modules of varying forms or dimensions.

18 Claims, 23 Drawing Sheets

U.S. PATENT DOCUMENTS

| | | | |
|---|---|---|---|
| 4,936,063 A | 6/1990 | Humphrey | |
| 4,961,712 A | 10/1990 | Schwenk et al. | |
| 4,993,959 A | 2/1991 | Randolph | |
| 5,180,442 A | 1/1993 | Elias | |
| 5,338,369 A | 8/1994 | Rawlings | |
| 5,409,549 A * | 4/1995 | Mori | 136/244 |
| 5,451,167 A | 9/1995 | Zielinski et al. | |
| 5,497,587 A | 3/1996 | Hirai et al. | |
| 5,524,401 A | 6/1996 | Ishikawa et al. | |
| 5,571,338 A | 11/1996 | Kadonome et al. | |
| 5,603,187 A | 2/1997 | Merrin et al. | |
| 5,687,453 A | 11/1997 | Megregian et al. | |
| 5,740,996 A | 4/1998 | Genschorek | |
| 5,788,204 A | 8/1998 | Goodwin et al. | |
| 5,851,309 A | 12/1998 | Kousa | |
| 1,306,434 A | 6/1999 | Melanson | |
| 5,924,486 A | 7/1999 | Ehlers et al. | |
| 5,986,203 A * | 11/1999 | Hanoka et al. | 136/251 |
| 6,106,310 A | 8/2000 | Davis et al. | |
| 6,195,066 B1 | 2/2001 | Pegues et al. | |
| 6,201,179 B1 | 3/2001 | Dalacu | |
| 6,269,596 B1 | 8/2001 | Ohtsuka et al. | |
| 6,283,770 B1 | 9/2001 | Leung et al. | |
| 6,320,120 B1 | 11/2001 | Van Haaster | |
| 6,323,478 B1 | 11/2001 | Fujisaki et al. | |
| 6,366,304 B1 | 4/2002 | Nakayasu et al. | |
| 6,465,724 B1 | 10/2002 | Garvison et al. | |
| 6,521,821 B2 | 2/2003 | Makita et al. | |
| 6,672,018 B2 * | 1/2004 | Shingleton | 52/173.3 |
| 6,959,517 B2 | 11/2005 | Poddany et al. | |
| 7,012,188 B2 * | 3/2006 | Erling | 136/251 |
| 7,293,748 B1 | 11/2007 | Hoser | |
| 7,406,800 B2 | 8/2008 | Cinnamon et al. | |
| 7,419,377 B1 | 9/2008 | Briere et al. | |
| 7,469,508 B2 | 12/2008 | Ceria | |
| 7,592,537 B1 * | 9/2009 | West | 136/251 |
| 7,721,492 B2 | 5/2010 | Plaisted et al. | |
| 7,774,998 B2 | 8/2010 | Aschenbrenner | |
| 2002/0078991 A1 | 6/2002 | Nagao et al. | |
| 2003/0010372 A1 * | 1/2003 | Dinwoodie | 136/244 |
| 2003/0015637 A1 * | 1/2003 | Liebendorfer | 248/237 |
| 2003/0071177 A1 | 4/2003 | Aussiker | |
| 2003/0094193 A1 * | 5/2003 | Mapes et al. | 136/244 |
| 2003/0201009 A1 * | 10/2003 | Nakajima et al. | 136/251 |
| 2003/0230451 A1 * | 12/2003 | Garrett | 182/45 |
| 2004/0011354 A1 * | 1/2004 | Erling | 126/621 |
| 2004/0163338 A1 * | 8/2004 | Liebendorfer | 52/173.1 |
| 2004/0187909 A1 | 9/2004 | Sato et al. | |
| 2005/0161074 A1 * | 7/2005 | Garvison et al. | 136/246 |
| 2005/0173190 A1 * | 8/2005 | Garrett | 182/45 |
| 2005/0257453 A1 | 11/2005 | Cinnamon | |
| 2006/0032527 A1 | 2/2006 | Stevens et al. | |
| 2006/0042682 A1 | 3/2006 | Wolfe et al. | |
| 2006/0086382 A1 * | 4/2006 | Plaisted | 136/244 |
| 2006/0118163 A1 | 6/2006 | Plaisted | |
| 2006/0124167 A1 * | 6/2006 | Fan et al. | 136/251 |
| 2006/0225780 A1 | 10/2006 | Johnson, III et al. | |
| 2007/0251567 A1 | 11/2007 | Plaisted | |
| 2007/0295391 A1 | 12/2007 | Lenox et al. | |
| 2008/0053009 A1 | 3/2008 | Plaisted | |
| 2008/0053517 A1 | 3/2008 | Plaisted | |
| 2008/0121273 A1 | 5/2008 | Palisted | |
| 2008/0169018 A1 | 7/2008 | Miyamoto et al. | |
| 2009/0019796 A1 | 1/2009 | Liebendorfer | |
| 2009/0038668 A1 | 2/2009 | Plaisted | |
| 2009/0165843 A1 | 7/2009 | Horioka et al. | |
| 2010/0018571 A1 | 1/2010 | Placer | |
| 2011/0005152 A1 | 1/2011 | Plaisted | |
| 2011/0173900 A1 | 7/2011 | Plaisted et al. | |
| 2011/0210085 A1 | 9/2011 | Plaisted | |

FOREIGN PATENT DOCUMENTS

| | | |
|---|---|---|
| EP | 0417303 A1 | 3/1991 |
| EP | 0587348 A2 | 3/1994 |
| EP | 0599497 A1 | 6/1994 |
| EP | 0614058 A2 | 9/1994 |
| EP | 0905795 A2 | 4/2000 |
| EP | 1873843 A2 | 1/2007 |
| JP | 09-184209 A | 7/1997 |
| JP | 10-159201 A | 6/1998 |
| JP | 11-186586 A | 7/1999 |
| JP | 11-204819 A | 7/1999 |
| JP | 2000-100490 A | 4/2000 |
| JP | 2001-214579 A | 8/2001 |
| JP | 2001-262800 A | 9/2001 |
| JP | 2004-251037 A | 9/2004 |
| JP | 2005-194771 A | 7/2005 |
| JP | 2007-262764 A | 10/2007 |
| WO | WO 02/41407 A1 | 5/2002 |

OTHER PUBLICATIONS

Communication Pursuant to Article 94(3) EPC in Application No. 06733720.04-1266, European Patent Office, May 25, 2010.

Examination Report of Jul. 25, 2011 in European Application No. 06733720.4.

Final Office Action dated Feb. 15, 2011 in U.S. Appl. No. 10/855,254.

Final Office Action dated Jun. 10, 2009 in U.S. Appl. No. 11/851,299, 10 pages.

Final Office Action dated Oct. 6, 2008 in U.S. Appl. No. 10/855,254, 21 pgs.

Final Office Action dated Aug. 15, 2011 in U.S. Appl. No. 12/761,325.

Final Office Action dated Jul. 20, 2011 in U.S. Appl. No. 11/836,140.

Final Office Action dated Dec. 4, 2009 in U.S. Appl. No. 10/855,254, 18 pgs.

Final Office Action dated Dec. 7, 2009 in U.S. Appl. No. 11/332,000, 11 pgs.

International Preliminary Report on Patentability in International Application PCT/US2006/001593, World Intellectual Property Organization, Jul. 26, 2007, 11 pages.

International Preliminary Report on Patentability in International Application PCT/US2007/075531, World Intellectual Property Organization, Oct. 15, 2009, 8 pages.

International Search Report and Written Opinion of the International Searching Authority in International Application PCT/US2007/69304, World Intellectual Property Organization, Mar. 4, 2008, 12 pages.

International Search Report and Written Opinion of the International Searching Authority in International Application PCT/US2006/001593, World Intellectual Property Organization, Oct. 27, 2006, 19 pages.

International Search Report and Written Opinion of the International Searching Authority in International Application PCT/US2007/77433, World Intellectual Property Organization, Mar. 26, 2006, 10 pages.

International Search Report and Written Opinion of Sep. 30, 2009 10 pages.

Non-Final Office Action dated Nov. 13, 2008 in U.S. Appl. No. 11/851,299, 9 pgs.

Non-Final Office Action dated Jun. 22, 2009 in U.S. Appl. No. 11/332,000, 13 pages.

Non-Final Office Action dated Jan. 24, 2008 in U.S. Appl. No. 10/855,254, 16 pgs.

Non-Final Office Action Dated Jun. 1, 2009 in U.S. Appl. No. 10/855,254, 17 pgs.

Non-Final Office Action dated Mar. 30, 2011 in U.S. Appl. No. 11/848,766.

Non-Final Office Action dated Sep. 9, 2011 in U.S. Appl. No. 12/947,601.

Non-Final Office Action dated Jul. 22, 2011 in U.S. Appl. No. 13/042,266.

Non-Final Office Action dated Mar. 25, 2011 in U.S. Appl. No. 12/761,325.

Non-Final Office Action dated Aug. 2, 2010 in U.S. Appl. No. 10/855,254; 28 pgs.

Non-Final Office Action dated Jul. 12, 2010 in U.S. Appl. No. 11/848,766.

Non-Final Office Action dated Mar. 15, 2010 in U.S. Appl. No. 11/750,948; 9 pgs.

Non-Final Office Action dated Nov. 9, 2010 in U.S. Appl. No. 11/836,140.
Non-Final Office Action dated Jan. 13, 2010 in U.S. Appl. No. 11/947,658 pgs.
Notice of Allowance dated Jul. 12, 2010 in U.S. Appl. No. 11/947,658.
Notice of Allowance dated Sep. 27, 2010 in U.S. Appl. No. 11/332,000.
Notice of Allowance dated May 6, 2010 in U.S. Appl. No. 11/332,000.
Notice of Allowance mailed Jan. 11, 2010 in U.S. Appl. No. 11/851,299; 8 pgs.
Notice of Allowance dated Sep. 30, 2010 in U.S. Appl. No. 11/750,948.
TELESTRUT Telescoping Strut; UNISTRUT; http://web.archive.org/web/20030202040614/http://www.unistrut.com/.
Unistrut Telespar Telescoping Tubing; UNISTRUT; http://web.archive.org/web/20030202040614/http://www.unistrut.com/.

* cited by examiner

RACK ASSEMBLY FOR MOUNTING SOLAR MODULES

PRIORITY APPLICATIONS

This application is a Continuation of U.S. patent application Ser. No. 11/332,000, filed Jan. 13, 2006 now U.S. Pat. No. 7,856,769 entitled RACK ASSEMBLY FOR MOUNTING SOLAR MODULES which is a:
(i) Continuation-in-part of U.S. patent application Ser. No. 10/855,254, filed May 26, 2004 entitled MECHANISM FOR MOUNTING SOLAR MODULES which claims benefit of priority to:
(ii) U.S. Patent Application No. 60/544,753, filed Feb. 13, 2004 and U.S. Patent Application 60/643,619, filed Jan. 15, 2005.

All of the above referenced applications are hereby incorporated by reference in their entirety for all purposes.

The U.S. Government has a paid-up license in this invention and the right in limited circumstances to require the patent owner to license others on reasonable terms as provided for by the terms of contract No. NDC-5-55022-01 and contract No. NDO-3-33457-02, both awarded by the Department of Energy.

TECHNICAL FIELD

The disclosed embodiments relate generally to the field of solar modules. In particular, the disclosed embodiments relate to a mechanism for mounting solar modules to a surface or sub-structure.

BACKGROUND

Modules for converting solar energy into useful forms of energy such as heat and electricity have been around for decades. Because of the suns low energy intensity and the low conversion efficiency of some solar modules, a large array of solar modules is often required to service the end-use of the energy. Arrays from several dozen to several thousand square feet are common. Moreover, the variety of surfaces on which the modules may be mounted requires a wide range of flexibility and adaptability in the mounting hardware that will be used to structurally anchor the modules to the surface.

High energy prices and the desire to 'build green' have led to increases in the use of solar photovoltaic (PV) modules to provide electricity and solar thermal modules to provide heating services for homes and other building structures. As a parallel development, architects and building owners have stressed the need for solar systems that are aesthetically or functionally integrated into the building façade for improved aesthetics.

DETAILED DESCRIPTION

Figure 1:
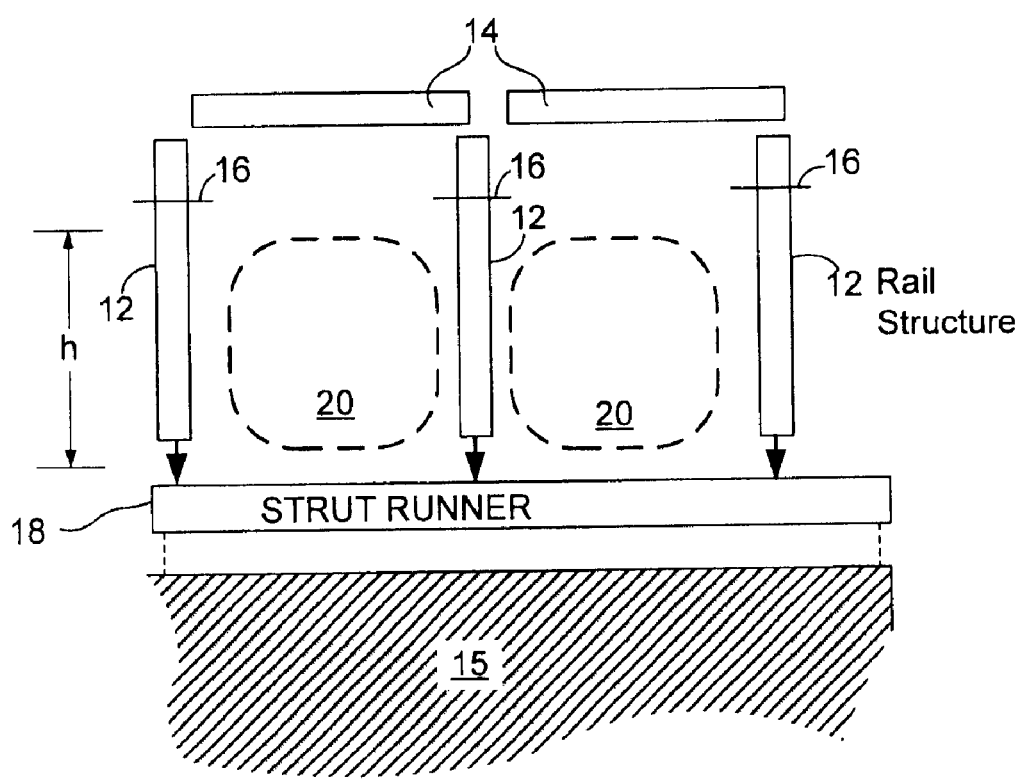
FIG. 1 is a block diagram of components that combine to form a rack assembly for supporting a solar module, under an embodiment of the invention.

According to an embodiment, a rack assembly is provided for use in mounting solar modules to form a solar array, in which components that comprise the rack assembly form at least a partial perimeter seal to the underlying body. Among other benefits, the perimeter seal enables enable the capture of heat generated from use of the solar modules for various purposes. These purposes may include increasing efficiency of photovoltaic cells and heating air. Additionally, the perimeter seal can provide other uses, such as a cosmetic skirt that further improves aesthetics by hiding the gap between the array and underlying body. The perimeter seal can be formed such that it diverts any precipitation running down the underlying body from penetrating the underside of the array. Moreover, any mounting penetrations made under the array is protected, and the rack assembly with the partial or complete perimeter seal enables a simple covering to be provided under the array if the underlying body needs to be weatherproofed (i.e. the roof of a house).

Although the deployment of a rack assembly with a sealed or partially restricted perimeter yields aesthetic and weather proofing benefits, it also restricts the flow of air underneath the array. In traditional installations of solar photovoltaic modules, this restriction of airflow is an undesirable effect and may lead to increased module temperatures and lower conversion efficiencies.

In one embodiment, a rack assembly or mounting system is arranged such that the combination of a seamless front surface and perimeter sealing yields air channels underneath the array of solar modules. The creation of these air channels allows for the heat generated by the solar modules to be captured and removed to increase their conversion efficiency and create a useable energy stream. The system may also employ solar thermal modules that act to further boost the air temperature, leaving the array for use in cold climates or other instances in which higher air stream temperatures are required.

According to an embodiment, a rack assembly is provided for mounting solar modules over an underlying body. The rack assembly may include a plurality of rail structures that are arrangeable over the underlying body to form an overall perimeter for the rack assembly. One or more retention structures may be provided with the plurality of rail structures, where each retention structure is configured to support one or more solar modules at a given height above the underlying body. At least some of the plurality of rail structures are adapted to enable individual rail structures to be sealed over the underlying body so as to constrain air flow underneath the solar modules. Additionally, at least one of (i) one or more of the rail structures, or (ii) the one or more retention structures are adjustable so as to adapt the rack assembly to accommodate solar modules of varying forms, dimensions or installation height or spacing requirements.

According to an embodiment, the rack assembly may include coupling structures that enable the rack assembly to be sealed over the underlying body. In an embodiment, the coupling structures are in the form of a flashing component, or a combination of flashing components. According to one embodiment, the combination of flashing components include a first or lower flashing component that enable a seal to be formed with the underlying body, and a counter flashing component that overlays where the lower flashing component joins the rack assembly.

In an embodiment, the retention structures are in the form of an extended member and an underlying or lower shelf. The retention structure enables retention of a solar module when a compressive force is applied to the extended member.

According to another embodiment, a rack assembly is provided for mounting solar modules over an underlying body. The rack assembly may be installed over an underlying body and include a plurality of rail structures that are arranged to form an overall perimeter. One or more retention structures may be provided with the plurality of rail structures to support one or more solar modules mounted therein at a given height over the underlying body. At least some of the plurality of rail structures are sealed over the underlying body so that at least a portion of the overall perimeter is closed. A channel may be formed at least in part by the at least some of the portion of the overall perimeter that is sealed over the underlying body and occupies at least a portion of the given height separating the one or more solar modules from the underlying structure.

Under another embodiment, a solar energy transfer system is provided over an underlying body. The system includes a plurality of solar modules that receive solar energy and convert the solar energy into electricity or heat. The plurality of solar modules may be of a given size that is within a range of possible sizes that can be handled by the rack assembly. A rack assembly supports the plurality of solar modules a given height over an underlying body. The rack assembly may be sealed across at least a portion of its perimeter to the underlying body to define, at least in part, one or more channels underneath the plurality of solar modules that constrains air flow. Additionally, the rack assembly is cooperatively positioned with an air driver to enable the air driver to direct air through the one or more channels so that the air is heated by heat from one or more of the plurality of solar modules.

Figure 10A:
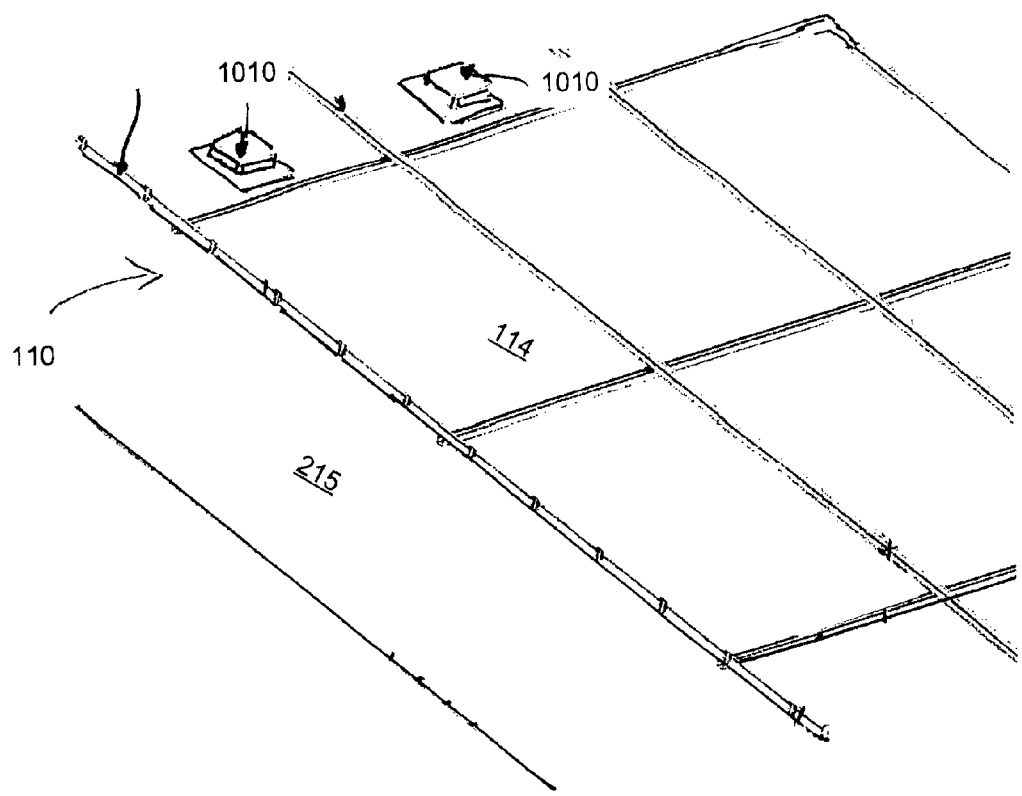
FIG. 10A illustrates an implementation in which a rack assembly is provided over a series of vents as part of a heat exchange system, according to an embodiment of the invention.
Figure 10B:
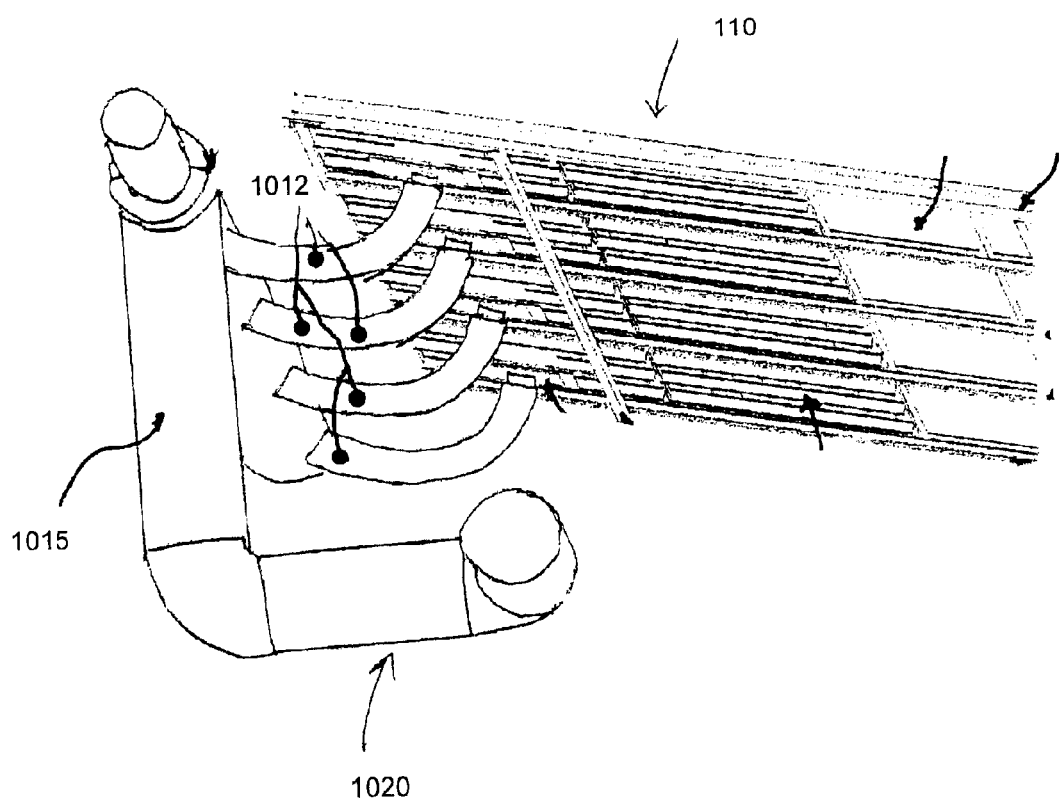
FIG. 10B illustrates an underside of a rack assembly, as implemented in FIG. 10A, under an embodiment of the invention.

As an example, FIG. 10A and FIG. 10B illustrate a rack assembly that is cooperatively engaged with an air driver, which may be provided through use of a vent. In particular, a vent may be provided underneath the rack assembly and be coupled to, for example, a fan for drawing air. Alternatively, the vent may blow air from one location to another underneath a rack assembly such as described by one or more embodiments.

Under another embodiment, a rack assembly includes a plurality of rail structures and a plurality of retention structures. The plurality of retention structures may be provided by the plurality of rail structures. In an embodiment, one or more of the plurality of retention structures are adjustable between adjacent rail structures in order to (i) loosely grasp and hold a given solar module to enable manual adjustment of the positioning and securement of the given solar module, (ii) mechanically secure and hold the given solar module in an installed position a given height over the underlying body.

Overview

FIG. 1 is a simplified illustration of a rack assembly for supporting solar modules, under one or more embodiments of the invention. As shown, a rack assembly 10 includes a plurality of rail structures 12 that provide support for individual solar modules 14. When installed, the rail structures 12 support the individual solar modules 14 a given height h above an underlying body 15. The underlying body 15 may correspond to any surface, platform or structure on which solar modules 14 are mounted. For example, underlying body 15 may correspond to a rooftop of a commercial or residential building. The solar modules 14 may correspond to photovoltaic solar cells that convert solar energy into electricity, or alternatively, solar heating modules which directly generate heat using solar energy.

According to one or more embodiments, the rail structures 12 are adjustable pair-wise, or in other combinations, in order to hold in place solar modules 14 of various dimensions and sizes. In one embodiment, the solar modules 14 are supported by a combination of retention structures 16. Each retention structure 16 may be provided with a corresponding one of the rail structures 12. In one embodiment, each retention structure 16 is a structural feature of the corresponding rail structure 12. For example, each rail structure 12 may comprise of multiple interconnected segments, and the retention structure(s) may be one of the interconnected elements. Alternatively, the retention structures 16 may be integrated or unitarily formed with the individual rail structures 12. Each retention structure 16 supports individual solar modules 14 by grasping edge segments. In one embodiment, the retention structures 16 and/or rail structures 12 are adjustable to grasp and support solar modules 14 of varying thicknesses and forms.

As shown by FIG. 1, an embodiment provides that rail structures 12 are mounted indirectly to the underlying body 15 through use of a set of strut runners 18. Each strut runner 18 mounts to the underlying body 15 and to multiple rail structures 12, thus providing lateral support to maintaining the rail structures 12 upright, while at the same time providing a buffer between the individual rail structures 12 and the underlying body 15. The rail structures 12 may mount to the strut runners 18, and the strut runners may mount to the underlying body 15.

According to an embodiment, the rack assembly 10 forms a portion of a solar heat exchange system that uses heat generated from the solar modules 14 for any one of various useful purposes. The heat exchange may be enabled by the formation of one or more channels 20 between an underside of solar modules 14 and the underlying body 15. An individual channel 20 may be defined in part by one or more of the rail structures 12, as well as the underlying body and possibly the underside of the solar modules 14. The individual channel 20 may occupy at least a portion of the thickness defined by the height h. The solar heat exchange system may further include other components, such as thermal panels 910 (FIG. 9A), as well as air directors that draw air into the channel 20, and/or push the air through the channel. When installed as part of a solar heat exchange system, the rack assembly 10 may be positioned to supply heated air to such air directors, and to be proximate to the environment that is to receive or use the heated air. For example, the rack assembly 10 may be installed on the rooftop of a dwelling, and also direct heated air into a vent or air circulation system of the dwelling as part of its ability to heat air in the channel 20.

Useful purposes for generating heat from the solar modules 14 may include, for example, any one or more of the following: (i) cooling the individual solar modules 14 (when photovoltaic) so as to make them more efficient, (ii) pulling air from the environment underneath the solar modules 14 for purpose of heating the air for another closed environment or system (e.g. for a house), and (iii) circulating air from the closed environment or system underneath the solar modules 14 to heat that air and use it for heat.

Installed Rack Assembly

Figure 2A:
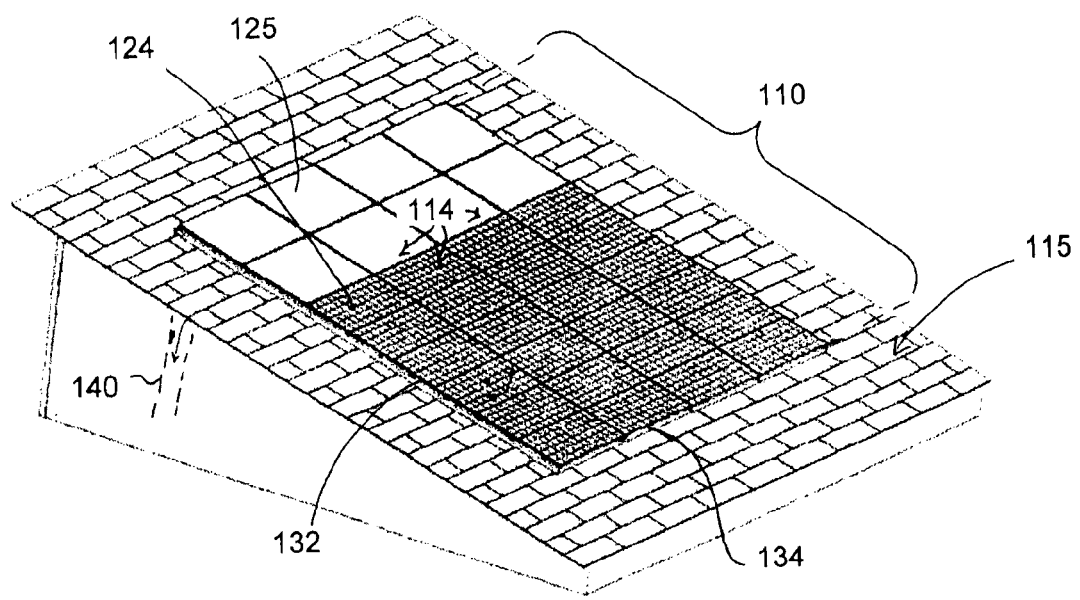
FIG. 2A illustrates an installed rack assembly that supports a set of solar modules over an underlying body, according to one or more embodiments of the invention.

FIG. 2A illustrates an installed rack assembly 110 that supports a set of solar modules 114 over an underlying body 115. The rack assembly 110 may be structured and adapted to include features such as described with one or more embodiments of the invention. The underlying body 115 may correspond to, for example, a rooftop or roof structure of a building or dwelling. In general, the underlying body 115 may correspond to any area, surface or platform that can receive sunlight and be connected to a building, place or location that can use the solar energy.

Embodiments of the invention contemplate that different types of solar modules 114 may be employed in various implementations and context. For example, as shown by FIG. 2A, the solar modules 114 include photovoltaic modules 124 and thermal modules 125. Under one embodiment, the perimeter may include one or more sealed lengths 132 and an open length 134 from which air from the environment is drawn. As will be described, channels (not shown in FIG. 2A) may be provided between the rack assembly 110 and underlying body 115 for purpose of constraining airflow. Air drivers (not show in FIG. 2A) may drive (e.g. push or pull) air within the formed channels. The solar modules 114 generate heat, either through design or as an inherent by-product. According to one or more embodiments, this heat warms the air as it is drawn from the environment and pulled through the channels formed underneath the solar modules 114.

Numerous alternatives and variations are contemplated. For example, all of the perimeter of the rack assembly 110 may be sealed, and air may drawn from within a dwelling on which the rack assembly 110 is provided. This air may be pushed through channels, then back into the dwelling when warmed. Alternatively, some or all of the open length 134 may be sealed, or conversely, portions of the sealed lengths 132 may be opened or perforated as part of an underlying channel system.

FIG. 2A illustrates one implementation in which heated air is directed into a duct 140 within a structure of the underlying body 115. For example, warm air may heat a dwelling on which the rack assembly 110 is installed, and the duct 140 enables the heated air to flow into the circulation system of the dwelling.

As mentioned, the solar modules 114 may be formed by a combination of the photovoltaic modules 124 and the thermal modules 125. The photovoltaic modules 124 can generate some residual heat when receiving solar energy and converting the solar energy into electrical current. In contrast, the thermal modules 125 may directly convert the solar energy into heat at a higher efficiency. The use and number of thermal modules 125 may depend on the use of the heated airflow, as well as the environment where the rack assembly 110 is installed. For example, when the purpose of heating air in the channels is to supply warm air to a dwelling of the underlying body 115, the thermal modules 125 have more use in colder environments, while warm environments may require only use of photovoltaic modules 124. Even in cold environments, thermal modules 125 may be used to convert solar energy into hot air due to the high operating efficiency achieved by their designs, and additional components may be used to drive the hot air into the dwelling.

Figure 2B:
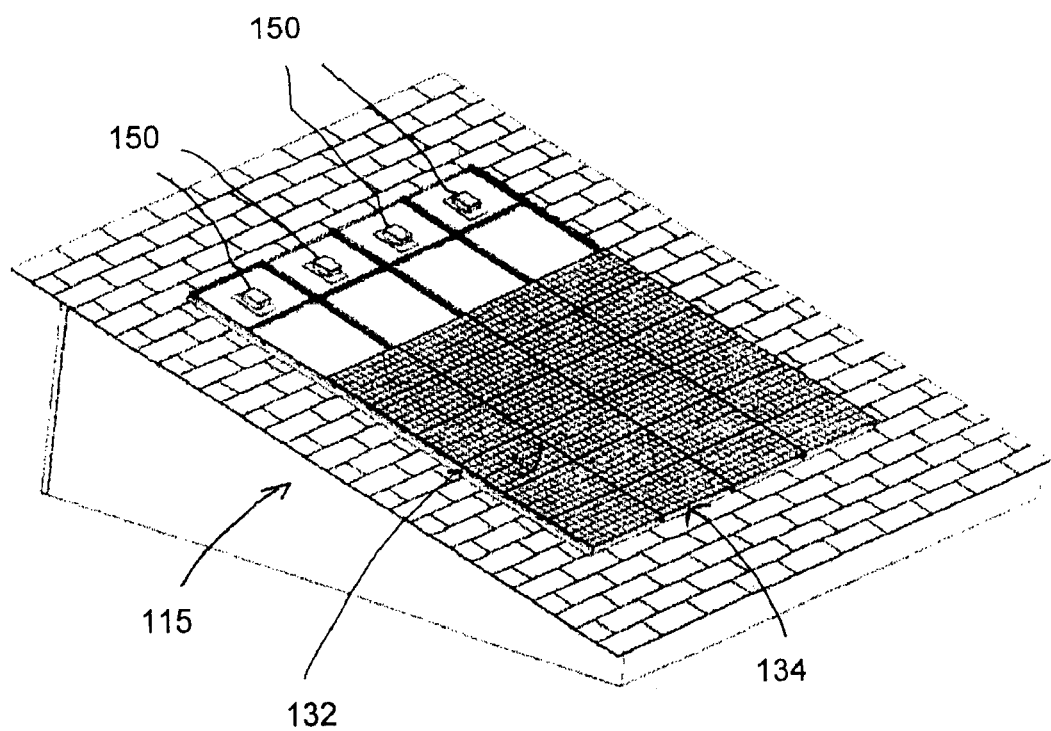
FIG. 2B illustrates another installed rack assembly that supports a set of solar modules over an underlying body, on which one or more vents are provided, according to one or more embodiments of the invention

FIG. 2B illustrates a variation similar to an embodiment such as shown in FIG. 2A, in that multiple ventilation outlets 150 may be employed for directing heated air from under the rack assembly. As such, the ventilation outlets are located underneath the thermal modules 125. As shown with FIG. 2A, the open length 134 of the perimeter is provided on one side, and the series of vents 150 are provided lengthwise on the other side of the perimeter formed by the rack assembly 110. For example, the vents 150 may guide the directed heated air inward into the structure of the underlying body 115.

Rail Structure

According to one or more embodiments, one of the overall primary structural elements of the overall rack assembly is a rail structure. Rail structures are elements that provide primary support to the solar modules, thus, for example, enabling the solar modules to be oriented to receive solar energy, while at the same time being securely fixed to resist wind and other forces. Under one embodiment, two types of rail structures may be provided. A free rail structure 220 supports solar modules 114 on one lateral side (left-right in the paper), so as to form a portion of the overall perimeter of the rack assembly 110 (FIG. 1) on its other side. Such a rail structure is shown and described with FIG. 3A. In contrast, a shared rail structure 240 (FIG. 3B) provides interior support, and supports solar modules on both a left side or a right side, so that it is shared by more than one solar module. Such a rail structure is shown and described by FIG. 3B. As will be described, each rail structure 220, 240 is adjustable to support solar modules 114 of varying sizes. Furthermore, embodiments provide that the rail structures 220, 240 may be configured to loosely grasp solar modules 114, before being adjusted to clamp down onto the solar modules. Among other benefits, this feature of the free and shared rail structures 220, 240 enables all of the solar modules to be placed in position before the individual rail structures 220, 240 are clamped down to affix the solar modules 114 as a set in the installed position. As will be described, one or more embodiments provide that the rail structures 220, 240 and associated features and structural elements may be used to implement a rack assembly, such as described with FIG. 1, FIG. 2A, FIG. 2B and elsewhere described in this application.

Figure 3A:
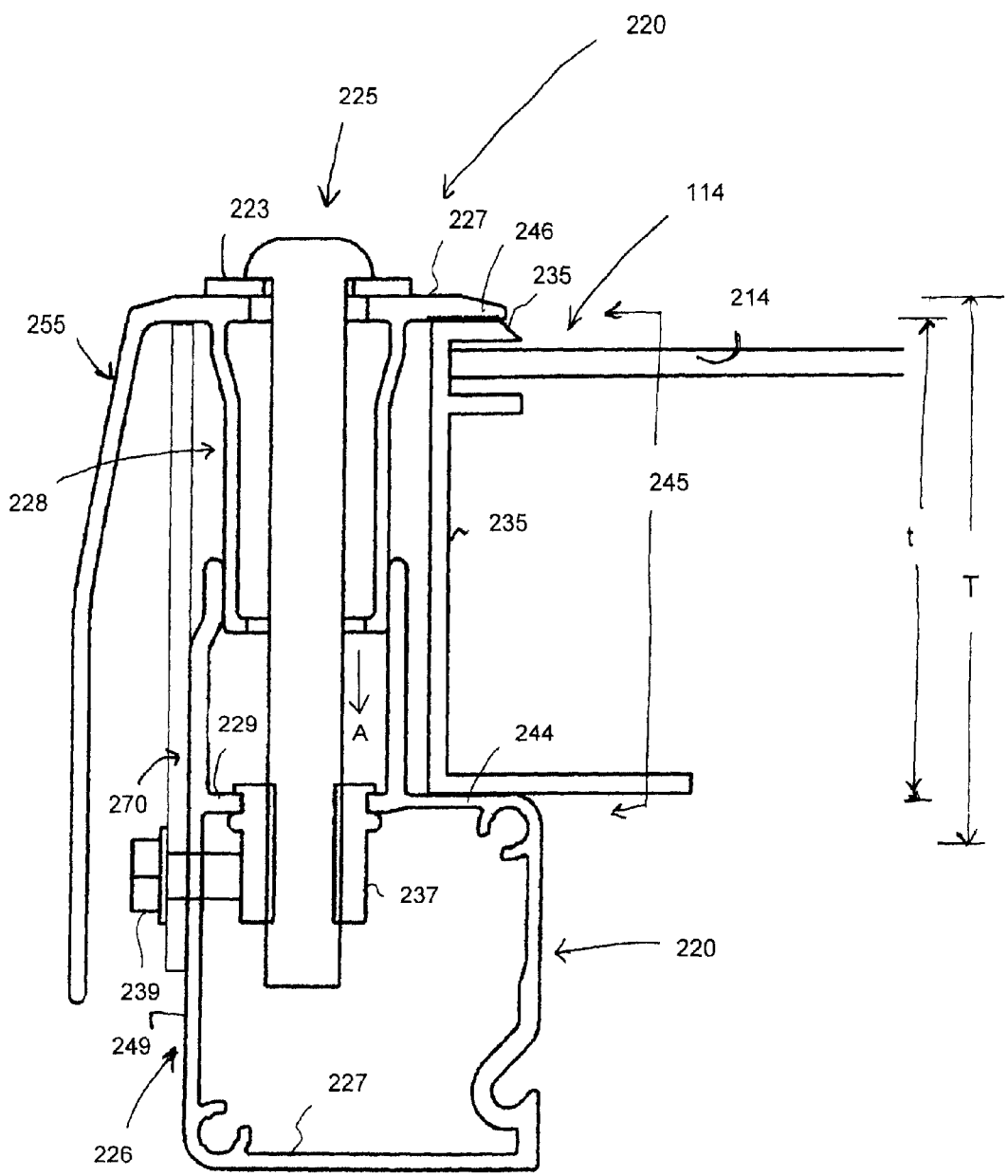
FIG. 3A is a side view of a free rail structure, according to an embodiment of the invention.
Figure 3B:
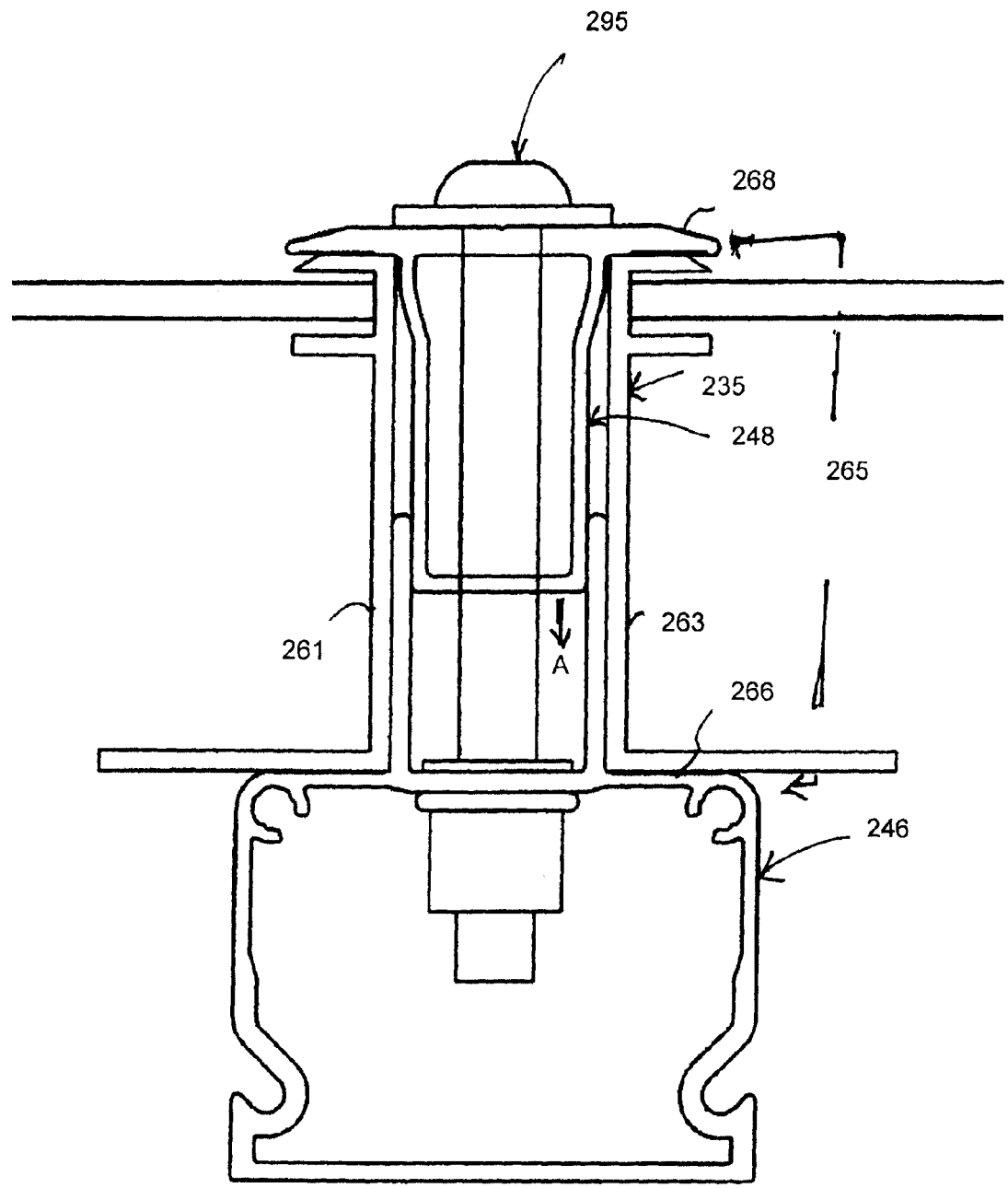
FIG. 3B is a side view of a shared rail structure, according to an embodiment of the invention.

According to one or more embodiment, such as shown by FIG. 3A and FIG. 3B, each rail structure 220, 240 has an interleaved assembly structure that can be (i) adjusted to loosely grip or retain individual solar modules 114, and (ii) compressed to clamp down on solar modules 114 and hold them in a fixed position. With reference to FIG. 3A, the free rail structure 220 supports a corresponding solar module 114 on one side, while forming a perimeter support of an overall rack assembly. Under one embodiment, the free rail structure 220 is a multi-piece element that can grasp and support an individual solar module from its edge section. Each solar module 114 has its own frame 235 on which an individual solar panel 214 (photovoltaic laminate or thermal glazing and absorber assembly) is supported in planar fashion. According to one embodiment, free rail structure 220 is adjustable to accommodate and grasp frames having any thickness t within a range T.

The interleaved construction of the free rail structure 220 includes a lower rail 226 and an upper rail 228. The upper rail 228 may be moved inward within the confines of lower rail 226, enabling an overall height of the free rail structure 220 to be contracted. Under one implementation, the inward movement of the upper rail 228 may be affected by a compression mechanism. In an embodiment, the compression mechanism, is in the form of a compression bolt 225, which enters a top surface 227 of upper rail 228 via a hole or slot. The bolt 225 may be tightened within the opening by threading into fastener 237 located on the lower rail 226, so as to cause the upper rail to move inward into the lower rail 226. A washer 223 may buffer the bolt 225 when it is compressed. The bolt 225 may be of sufficient length to extend through a floor 229 of the upper rail 228 and into an interior of the lower rail 226. However, under one embodiment, the length of the bolt 225 is not so long as to cause the bolt 225 to extend through a floor 227 of the lower rail 226. The range of T may be dependent on one or more of the size of the compression bolt 225, and the amount that the upper rail 228 can be pushed into the lower rail 226.

In order to hold individual solar modules 114 captive, each free and shared rail structure 220, 240 may include one or more retention structures 245, 265. The retention structures may grasp on to an edge section of the frame 235 for an individual solar module 114. In an embodiment, the retention structure 245 is in the form of a lower shelf 244 and an upper extension 243. When the bolt 225 is clamped down, the upper rail 228 is moved inward into the confines of the lower rail 226, causing the upper extension to press the frame 235 of the solar module 114 against the lower shelf 244. An overall movement of the upper rail 228 is shown by A. The resulting force affixes that edge section of the solar module 114 with the rail structure 220. The solar module 114 may be installed when the free and shared rail structures 220, 240 are secured to the underlying body. As will be described, the securement of the solar modules 114 to the underlying body may include one or more strut runners 450 (see FIG. 4A and FIG. 4B), which may be used to interconnect the free rail structure 220 and the shared rail structure 240 to the to the underlying body, as well as to each other. However, use of strut runners is a design implementation, as alternatives are contemplated. For example, as an alternative or addition, each of the rail structures 220, 240 may be secured directly to the underlying structure.

According to an embodiment, some or all of that free rail structure 220 is sealed over the underlying body on which the rack assembly 110 is mounted. In particular, one embodiment provides that free rail structure 220 is sufficiently sealed to confine the flow of air within a channel or other boundary defined by the rail structure. In one embodiment, free rail structure 220 is used with one or more flashing features or components, which may be combined with other sealants or materials in order to effectuate a seal of the rail structure 220 over the underlying body. In an embodiment shown by FIG. 3A, one of the flashing features is made integral to the rail structure 220. An overlaying or upper flashing component 255 may extend laterally and downward from relative to the exterior side 249 of the free rail structure 220. The purpose of the overlaying flashing component 255 is to overlay an underlying flashing component (not shown in FIG. 3A), which may be installed separately from the free rail structure. In this way, the upper flashing component 255 may be considered a counter flashing. Additional details on the flashing arrangement is described in greater detail, including with FIG. 4A.

It is possible for the application of the compression on the upper rail 228 to cause an unwanted moment, particularly to bend the upper rail 228 outward, away from the solar module 114. To counter this unwanted moment, a shim plate 270 may be provided to support the exterior side 249 from application of the compression force (which may be brought on by the compression bolt 225). The shim plate 270 may be formed from rigid and strong material, such as metal, and made to be adjustable in height relative to the free rail structure 220, to accommodate the varying height t of the rail structure. The shim plate 270 may be positioned so its top edge is provided just under the upper flashing component 255. One or more threaded fasteners 239 (e.g. screws) may be used to secure the vertical position of the shim plate 270 in the lower rail 226. Due to the localized nature of the compression force being resisted, the shim plate need not span the length of the rail structure 220. Individual shim plates 270 may be employed in proximate location to one or more compression bolts 225 along the rail structure 220. Further, alternative structures, features or means may be used instead of the shim plate 270 to achieve the same effect.

FIG. 3B illustrates the shared rail structure 240 that is located internal to perimeter of the rack assembly 110, according to an embodiment. The shared rail structure 240 may have similar construction as the free rail structure 220 (FIG. 3A), in that it may include a lower rail 246 and an upper rail 248, with the upper rail being able to be compressed and moved inwards within confines of lower rail 246. The directional arrow A illustrates the movement of the upper rail 248 within the lower rail 246. A compression mechanism may compress the upper rail 248. As with the free rail structure 220, the shared rail structure 240 includes retention structures 265 for holding solar modules 114. However, the shared rail structure 240 may include retention structures 265 on opposing lateral sides 261, 263, rather than just one side (as is the case with the free rail structure 220). Each retention structure 265 may include a lower shelf 266 and an upper extension 268, similar to corresponding features on the free rail structure, for enabling the grasping of frames 235 of individual solar modules 114. According to one embodiment, the compression mechanism may be in the form of a compression bolt 295, which can be tightened inward by threading into a fastener 247 located on the lower rail so as to compress the upper rail 248. Tightening of the compression bolt 295 causes the upper extensions 268 to press corresponding solar module frames 235 against the lower shelves 266.

In use, an embodiment such as shown provides for the shared rail structure 240 to support a pair of solar modules 114, with one solar module on each side. As with the free rail structure 220, each solar module may be gripped and supported from its perimeter or near its perimeter section, using the frame 235 of the solar module. An opposing perimeter of each solar module 114 may be held by either one of the free rail structures 220, or another one of the shared rail structures 240. The use of the compression mechanism and the retention structure 265 enables the shared rail structures 240 to loosely grip solar modules 114 in position before application of the compression force that affixes the individual solar modules in an installed position. In connection with the free rail structure 220 that can be adjusted in similar fashion, solar modules 114 may be loosely placed in clusters and affixed at one time, saving time, energy and improving the results of the installation.

Figure 4A:
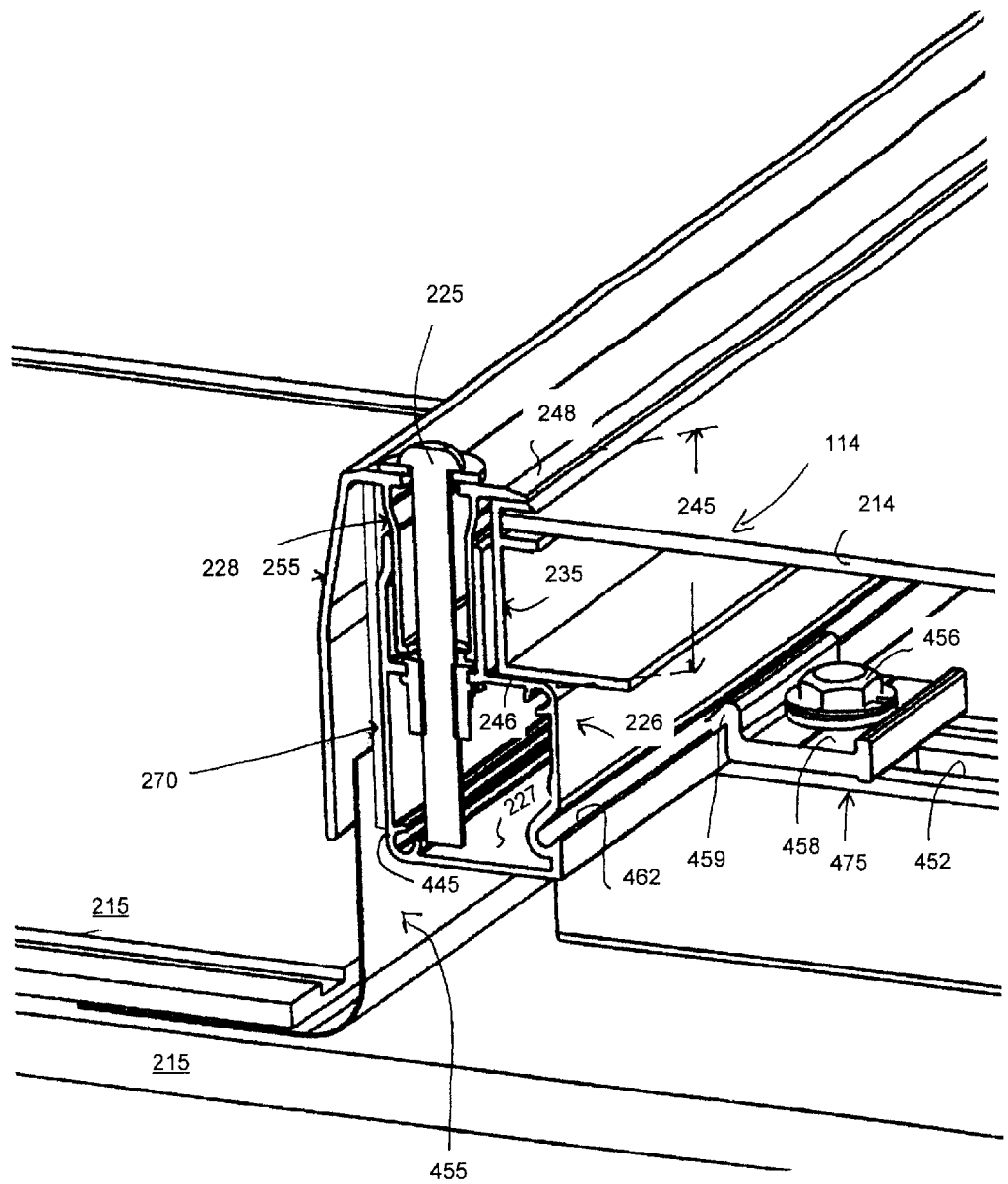
FIG. 4A and FIG. 4B are isometric views of a free rail structure and a shared rail structure, respectively, as provided in an installed rack assembly, according to one or more embodiments of the invention.
Figure 4B:
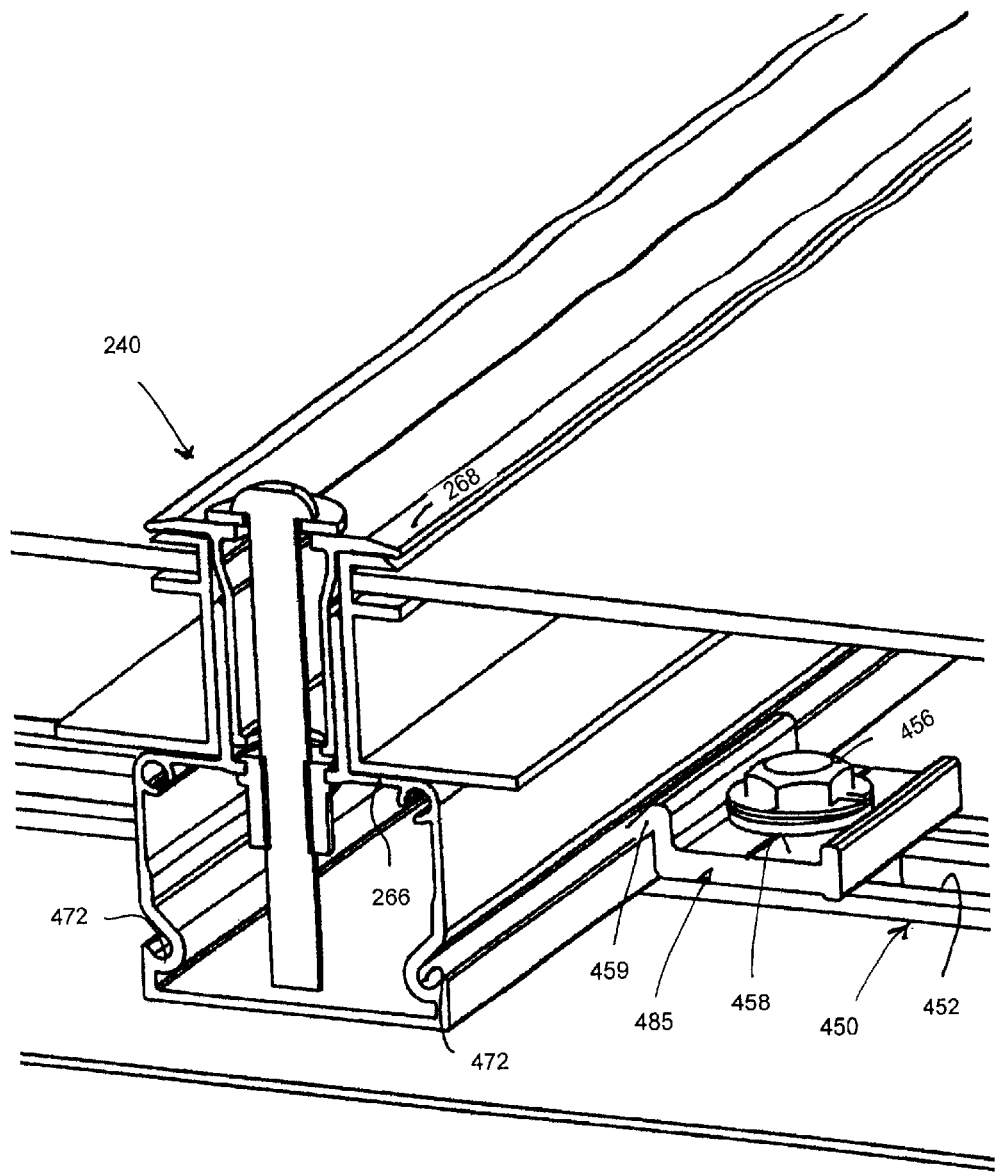

FIG. 4A and FIG. 4B are isometric views of a free rail structure 220 and shared rail structure 240, respectively, as provided in an installed rack assembly, according to one or more embodiments of the invention. In FIG. 4A, free rail structure 220 is installed on the underlying body 215 through a strut runner 450. The free rail structure 220 is also sealed over the underlying body 215, so as to form a portion of one of the closed lengths 134 (FIG. 2A) of the overall perimeter. When installed, free rail structure 220 retains solar module 114 by grasping the solar modules frame 235 using retention structure 245 formed by the combination of upper extension 243 and lower shelf 241. In the compressed state, the bolt 225 extends through upper rail 228 and into lower rail 226. The entire rail structure 220 is secured to underlying strut runner 450, which in an implementation shown, extends orthogonal across the underlying body 215 relative to the direction of the free rail structures 220. In this way, each strut runner 450 may interconnect at least one free rail structure 220 with a shared rail structure 240 or another free rail structure 220. One implementation provides that each strut runner 450 extends across the entire rack assembly 110 (FIG. 2A), so as to interconnect each free and shared rail structure 220, 240. The strut runner 450 may include a slot 452 for receiving a threaded fastener, such as a bolt 456 passing through a clip 458. This bolt 456 and clip 458 may slide along slot 452. Clip 458 may include a mounting edge 459 that can be forced into a friction fit within a corresponding groove formation 462 on the lower rail 226 of the free rail structure 220. In one implementation, the mounting edge 459 may be placed within the corresponding groove formation 462 and compressed to remain coupled therein by application of bolt 456. In this way, rail structure 220 is secured to the strut runner 450. The strut runner 450 may be secured to the underlying body 215 through traditional fasteners, such as screws and bolts, but numerous other means are possible, such as adhesives or an engaged fit within the underlying body 215, or a combination thereof. When installed, the free rail structure 220 sits over the strut runner 450, so that in between adjacent strut runner's 450, a gap is formed between the underlying body 215 and the floor 227 of the lower rail 226.

In order to seal the free rail structure 220 to the underlying body 215, flashing components may be used. A lower flashing component 455 may extend a thickness into the underlying body (e.g. under the roofing material of the underlying body 215) and bend upward to be mated against a lower external side 445 of the rail structure 220. In one embodiment, the shim plate 270 is provided between the lower flashing component 455 and the lower external side 445. The lower flashing component 455 may include sealants to effect a seal with the underlying body 215, as well as with the lower external side 445 of the rail structure 220. The upper flashing component 255 may extend outward from the external side of the rail structure 220 then downward, so as to overlay the lower flashing component 455, and in particular, the joining of the lower flashing component to the lower external side 445 (or to the shim plate 270) of the rail structure 220. In an embodiment such as shown by FIG. 4A, the combination of the upper and lower flashing components 455, 255 enable the free rail structure 220 to be sealed over the underlying body 215 while being supported by the strut runner 450. As will be explained in greater detail, the sealed free rail structure 220 enables formation of the closed lengths 132 (FIG. 2A), and as such, enables the formation of channels underneath the solar modules 114.

FIG. 4B is an isometric view of the shared rail structure 240, for use with the rack assembly 110 (FIG. 1), according to an embodiment of the invention. The shared rail structure 240 may share the strut runner 450 with one or more free or shared rail structures 220, 240. As described, the strut runner 450 includes a pair of coupling mechanism 485, having components similar to the coupling mechanism 475 of the free rail structure 220 in FIG. 4A. As such, each coupling mechanism 485 may comprise of the slot 452 in which the bolt 456 and the clip 458 are provided. As such, one such bolt 456 and clip 458 may be provided on each lateral side of the free rail structure 240. With shared rail structure 240, grooved formations 472, 472 may be provided on each lateral side of the lower rail 226 of the free rail structure 220. Each of the grooved formations 472, 472 may receive the mounting edge 459 of the clip 458 provided on the respective side of the shared rail structure 240. Thus, the shared rail structure 240 may have substantially similar construction with the free rail structure 220, with the exception that since no lateral side of the shared rail structure is external, the additional grooved formation 472 is provided instead of any flashing components.

On each lateral side of the shared rail structure 240, the upper extension 268 and lower shelf 266 comprise the retention feature 265 that supports the frame 235 of the corresponding solar module 114. The compression bolt 295 may insert and compress the upper rail 248 to move inward into the lower rail 246 and direct the respective upper extension 268 and lower shelf 266 to support the frame 235 of the solar module 114.

Since no external side is provided, an embodiment provides that the shared rail structure 240 is not sealed over the underlying body 215. Rather, an embodiment provides that the shared rail structure 240 to be raised by the strut runner 450 and provide vertical support to the solar modules 114. However, alternative implementations and designs may be used, such as to the relationship of the shared rail structure 240 with the underlying body 215. For example, in one implementation, a winding channel arrangement may be formed under a given rack assembly 110 (FIG. 2A), in part through the formation of barriers formed by sealing the shared rail structures 240 to the underlying body.

Embodiments described herein illustrate use of inherent structural surfaces to form channels for constraining airflow, under an embodiment of the invention. In FIG. 4A, the channel may be formed by an interior surface of the lower flashing component 455, as well as by an underside of the solar panel 214 or module 114, and the rail structure 220. In one implementation, the shared rail structure 240 may be raised so that airflow is constrained underneath it. Alternatively, ducts or other materials may be provided in the spacing under the rack assembly 110 to form bends and paths for the airflow.

Figure 5A:
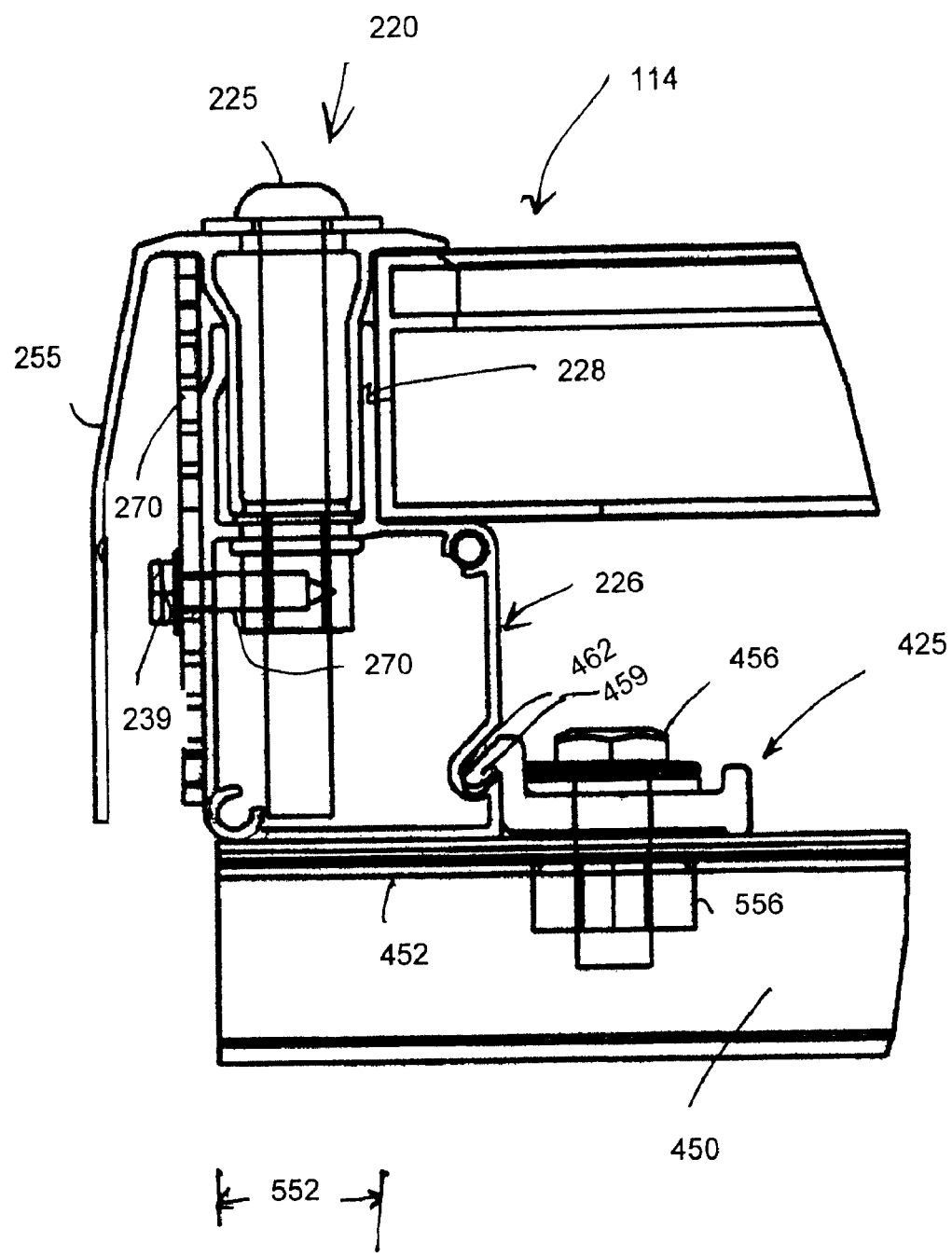
FIG. 5A and FIG. 5B are side cross-sectional views of a free rail structure and a shared rail structure respectively, as mounted to a common strut runner, according to one or more embodiments of the invention.
Figure 5B:
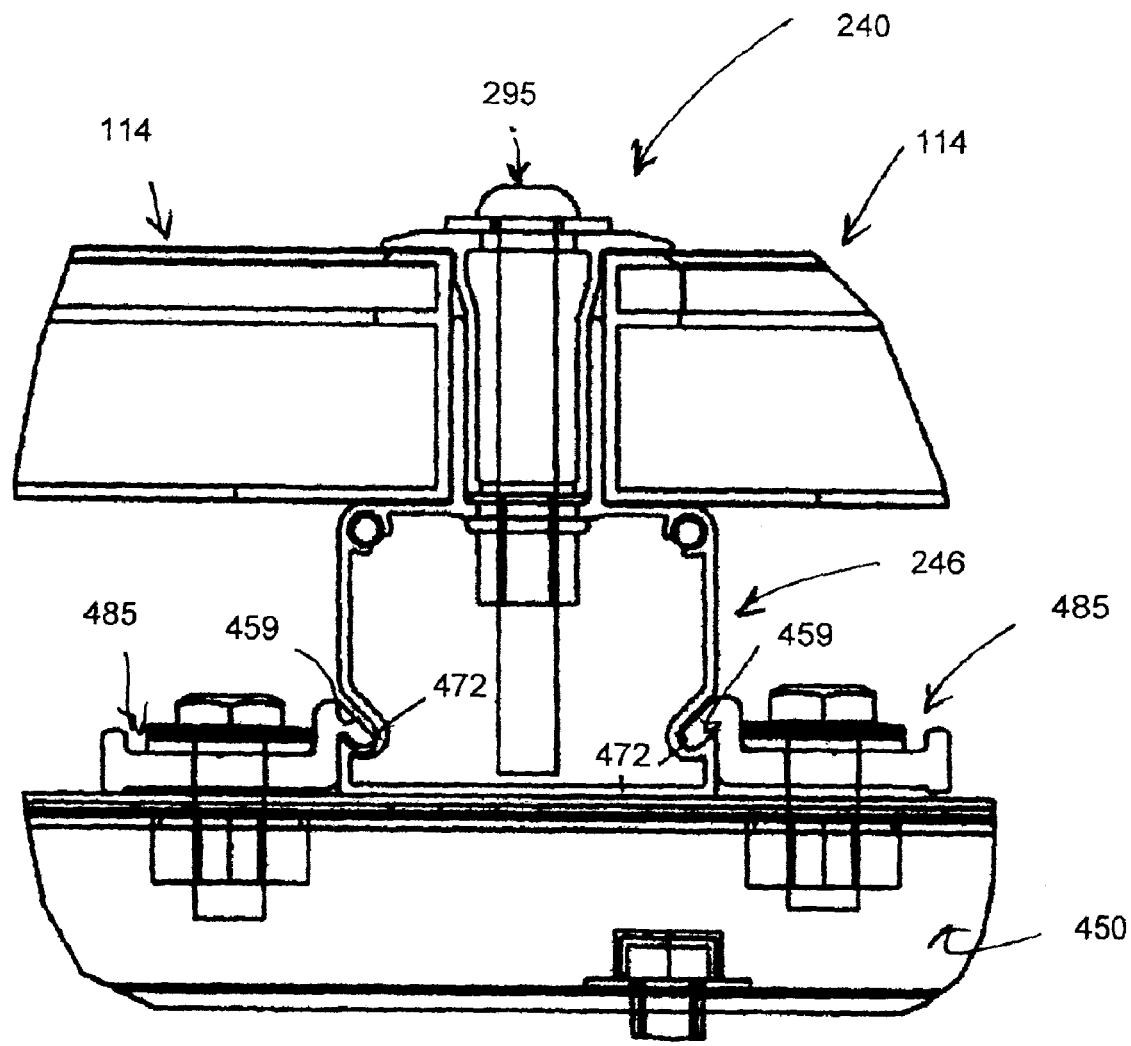

FIG. 5A and FIG. 5B are side cross-sectional views of the free rail structure 220 and the shared rail structure 240 respectively, as mounted to the common strut runner 450. In FIG. 5A, free rail structure 220 is mounted to a peripheral section 552 of the strut runner 450. In practice, an array or arrangement of solar modules 114 may require multiple strut runners 450 coupling multiple rail structures 220, 240. In an embodiment such as shown, the strut runner 450 includes the slot 452 extending its length for receiving threaded fasteners from mounted rail structures 220, 240. The coupling mechanism 475 includes a nut 556 and bolt 456 with clip 458 that mounts the free rail structure 220 to the strut runner 450. The strut runner 450 may be hollow so that nut 556 may secure each bolt 456 in place to prevent lateral movement (left to right in the paper) across the length of the strut runner 450, as well as removal of the bolt from the slot 452. The mounting of the free rail structure 220 may include insertion of the mounting edge 459 into the groove formation 462 on the inward lateral side of the free rail structure 220.

As shown in FIG. 5A and FIG. 5B, the individual solar modules 114 supported by the rail structures are planar in their positioning over the rail structures 220, 240, which provide the vertical support with the retention structures. The compression bolt 225 of the rail structure 220 may, when compressed, extend through upper rail 228 into the lower rail 226, but stop short of penetrating or contacting the strut runner 450.

As shown by FIG. 5A, the shim plate 270 is mounted to the exterior side of the rail structure 220. The fastener 239 inserts into the shim plate 270 to maintain the shim plate in an upright position at a desired height. In this way, the shim plate 270 provides support against unwanted movement, directed to the free end of the rail structure 220. The upper flashing component 255 extends outward from the rail structure so as to partially overlay the shim plate 270, and the lower flashing component when it is sealed to the shim plate 270 and/or exterior side of the rail structure 220.

With regard to FIG. 5B, shared rail structure 240 supports a pair of solar modules 114, 114, with one solar module provided on each lateral side of that rail structure. Under one embodiment, a single strut runner 450 may extend across the underlying surface 215 (not shown in FIG. 5B) and support a row of free rail structures 220 (FIG. 5a) and shared rail structures 240. The strut runner 450 may be secured to the underlying body 215 at various points, using, for example, screws, adhesives or other coupling mechanisms.

As with the free rail structure, the compression bolt 295 may compress the upper rail 248 within the lower rail 246, while not contacting or penetrating the strut runner 450. The lower rail 246 of the shared rail structure 240 includes the grooved formations 472, 472 on each lateral side. Each coupling mechanism 485, 485 includes the mounting edge 459 or other member to insert into the respective groove formation 472, 472 in order to secure the shared rail structure 240 to the strut runner 450. According to an embodiment, each coupling structure 485, 485 may operate to secure to the strut runner 450 and to the respective groove formations 472, 472 to secure each shared rail structure from one of the two lateral sides.

Rail Structure Components

Figure 6A:
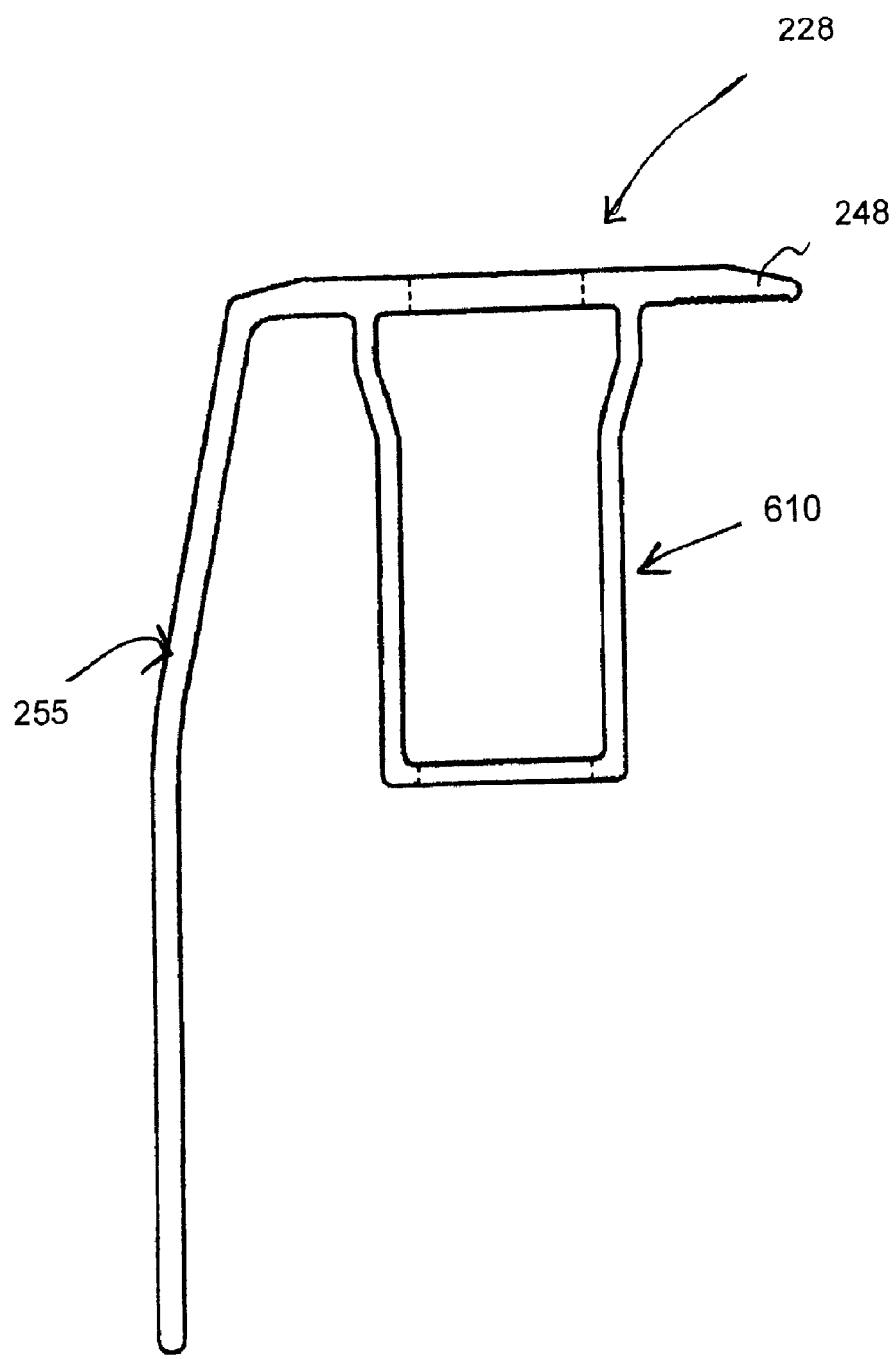
FIG. 6A and FIG. 6B illustrate an upper rail and a lower rail of a free rail structure, according to one or more embodiments of the invention.
Figure 6B:
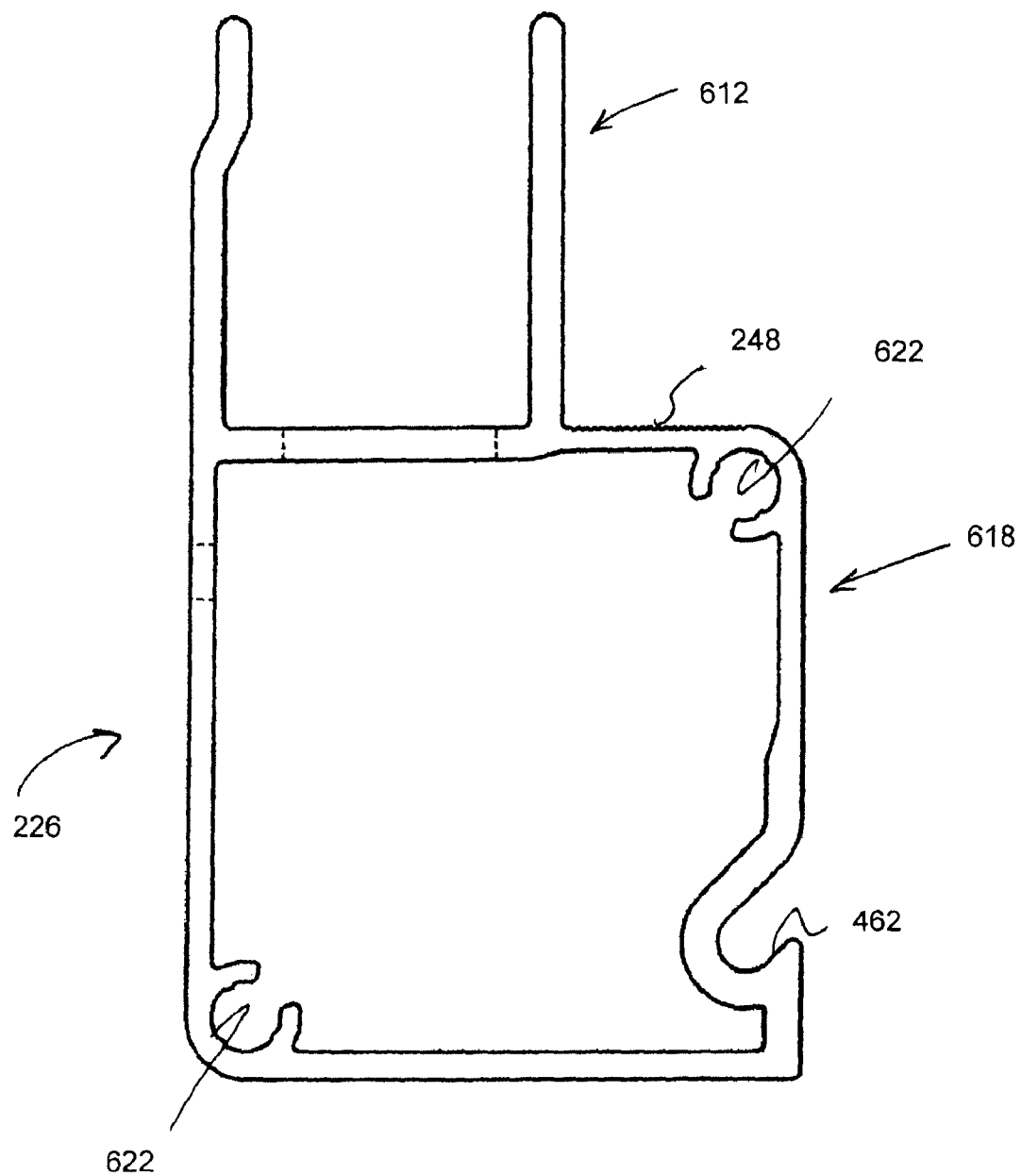

FIG. 6A and FIG. 6B illustrate the upper rail 228 and lower rail 226 of the free rail structure 220, according to one or more embodiments of the invention. In an embodiment such as shown, the free rail structure 220 (FIG. 3A and FIG. 4A) is a multi-piece component, although other embodiments contemplate a more unitary construction. In FIG. 6A, the upper rail 228 is shown with the upper flashing component 255. The upper flashing component 255 provides a counter flash to the installed lower flashing component 455 (FIG. 4A). In this way, the upper flashing component 255 serves to shield the merger of the lower flashing component 455 with the exterior surface of the free rail structure 220. A rail segment 610 of the upper rail is dimensioned to allow insertion of that section and movement of the upper rail 228 within the lower rail 226 (FIG. 6B), at least to an extent to accommodate the range T (FIG. 3A).

While in FIG. 6A, the upper flashing component 255 is shown to be a unitary member of the rail structure (formed, for example, through a process of metallurgically shaping), other embodiments and implementations consider the upper flashing component (if provided) to be an attached or assembled component.

In FIG. 6B, the lower rail 226 is provided having a receiving segment 612 and a base 618. The receiving segment 612 is open to receive the rail segment 610 of the upper rail 228. In one embodiment, a dimension of the opening of the receiving segment 612 is slightly greater than the dimension of the rail segment 610 of the upper rail 228. This allows insertion of the rail segment 610.

With reference to FIGS. 6A and 6B, each of the upper rail 228 and lower rail 226 combine to form and provide part of the overall retention feature 245 (FIG. 4A). In an embodiment, the upper extension 243 is provided in the form of a flange member or extension from a top (or near top) surface of the upper rail 228. The lower shelf 241 is formed by the base 618 having a greater dimension than the receiving segment 612, so that the lower shelf 241 forms. As such, the lower shelf may, under one embodiment, be part of the lower rail 226.

With further reference to FIG. 6B, the lower rail 226 may include, as an integral or unitary feature, groove formation 462 for receiving the mounting component 475 (FIG. 4A). Additionally, engagement openings 622 for receiving threaded or other coupling members for purpose of enabling an end cap (not shown) to be coupled and secured to the end of the lower rail 226. In an implementation, the engagement openings 622 are provided on diametric corners of the base 618 of the lower rail 226. The end caps provide decorative features, as well as the retention of solar modules 114 during assembly.

Figure 7A:
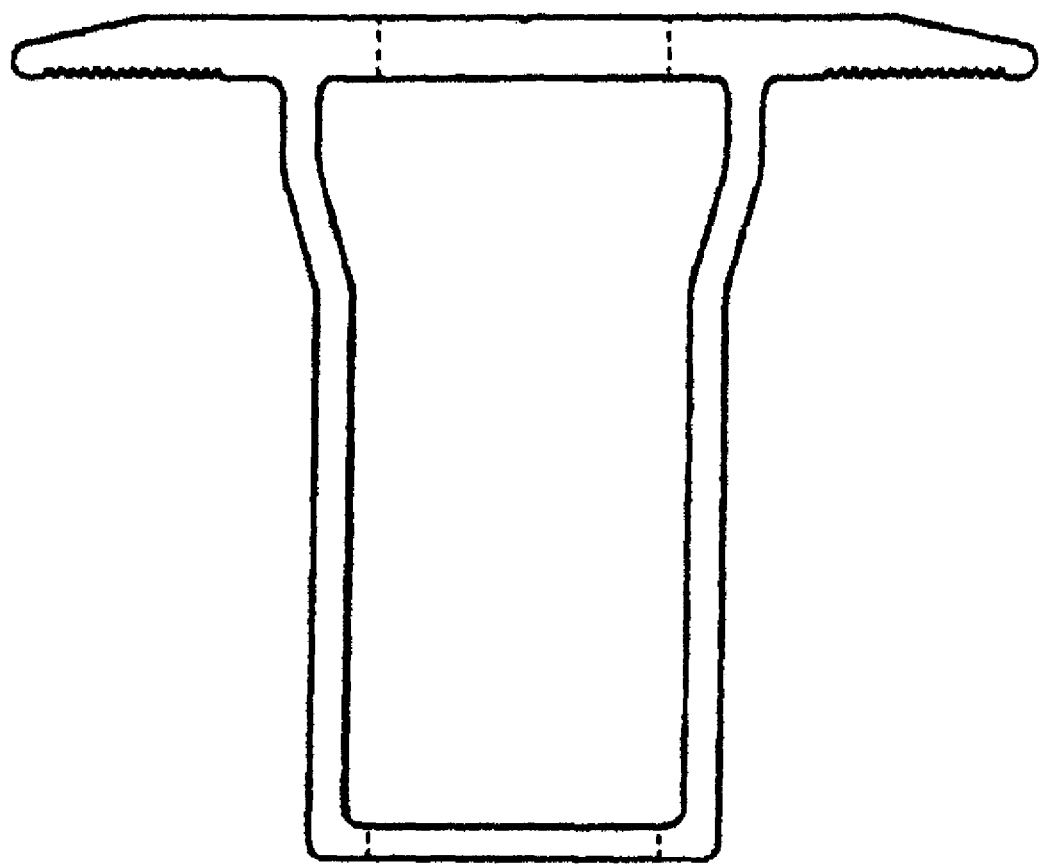
FIG. 7A and FIG. 7B illustrate an upper rail and a lower rail of a shared rail structure, according to one or more embodiments of the invention.
Figure 7B:
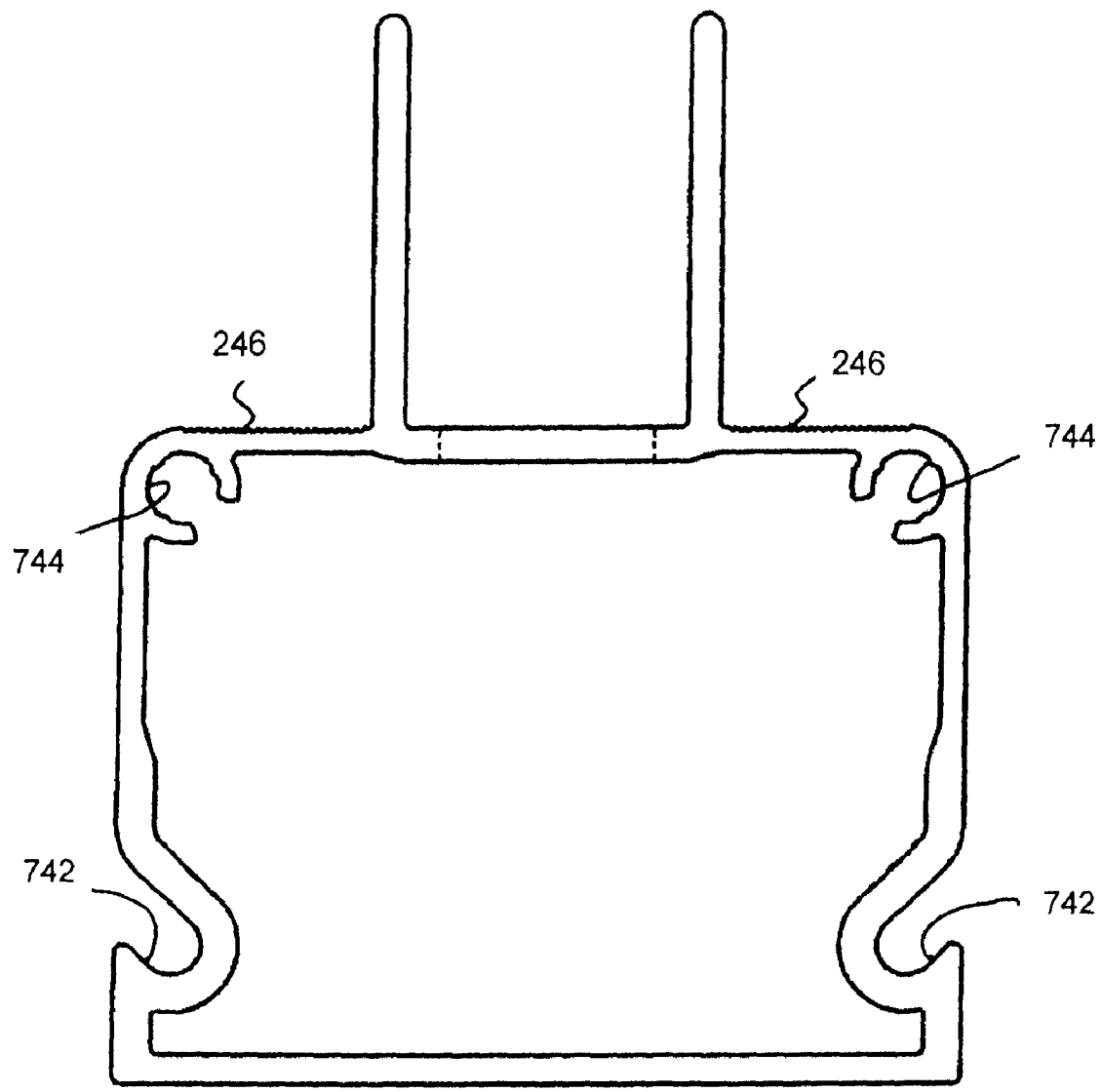

FIG. 7A and FIG. 7B illustrate the upper rail 248 and lower rail 246 of the shared rail structure 240, under one or more embodiments of the invention. In FIG. 7A, the upper rail 248 is similar to that of the free rail structure 220, except that two upper extensions 243 are extended laterally in opposite directions. The two upper extensions 243 form portions of the overall retention feature 265, which is provided on each side to separately grip and support different solar modules 114.

Likewise, in FIG. 7B, the base 718 provides separate lower shelves 246, each for receiving and vertically supporting the frame 235 (FIG. 3A) of the solar modules when compression occurs. At the bottom of the base 718, grooved formations 472 (FIG. 4B) are provided on each lateral side for purpose of receiving the engagement ends 459 of corresponding coupling structures. As with the free rail structure 220, one or more engagement openings 744 may be provided to receive end caps similar to those of free rails 220. In contrast to an embodiment such as shown in FIG. 6B, the engagement openings are provided at the top of the base 718, to accommodate opposing groove formations 472 that couple the rail structure to a corresponding one of the strut runners 450.

End Segment Construction

In an embodiment such as shown above, a direction in which the free rail structure 220 extends provides one perimeter dimension of the overall rack assembly 110 (FIG. 2A and FIG. 2B). Another dimension may be provided by of the strut runner 450, or other interconnecting members that extend between free and shared rail structures 220, 240. Under one or more embodiments of the invention, structures for capping and sealing the rack assembly on the perimeter in an overall direction of the strut runners 450 are referred to as end segments. In order to create channels through sealing lengths of the overall perimeter of the rack assembly, an embodiment provides that one or both of the end segments (assuming a rectangular configuration) are sealed in whole or in part to the underlying body on which the rack assembly is provided.

Figure 8A:
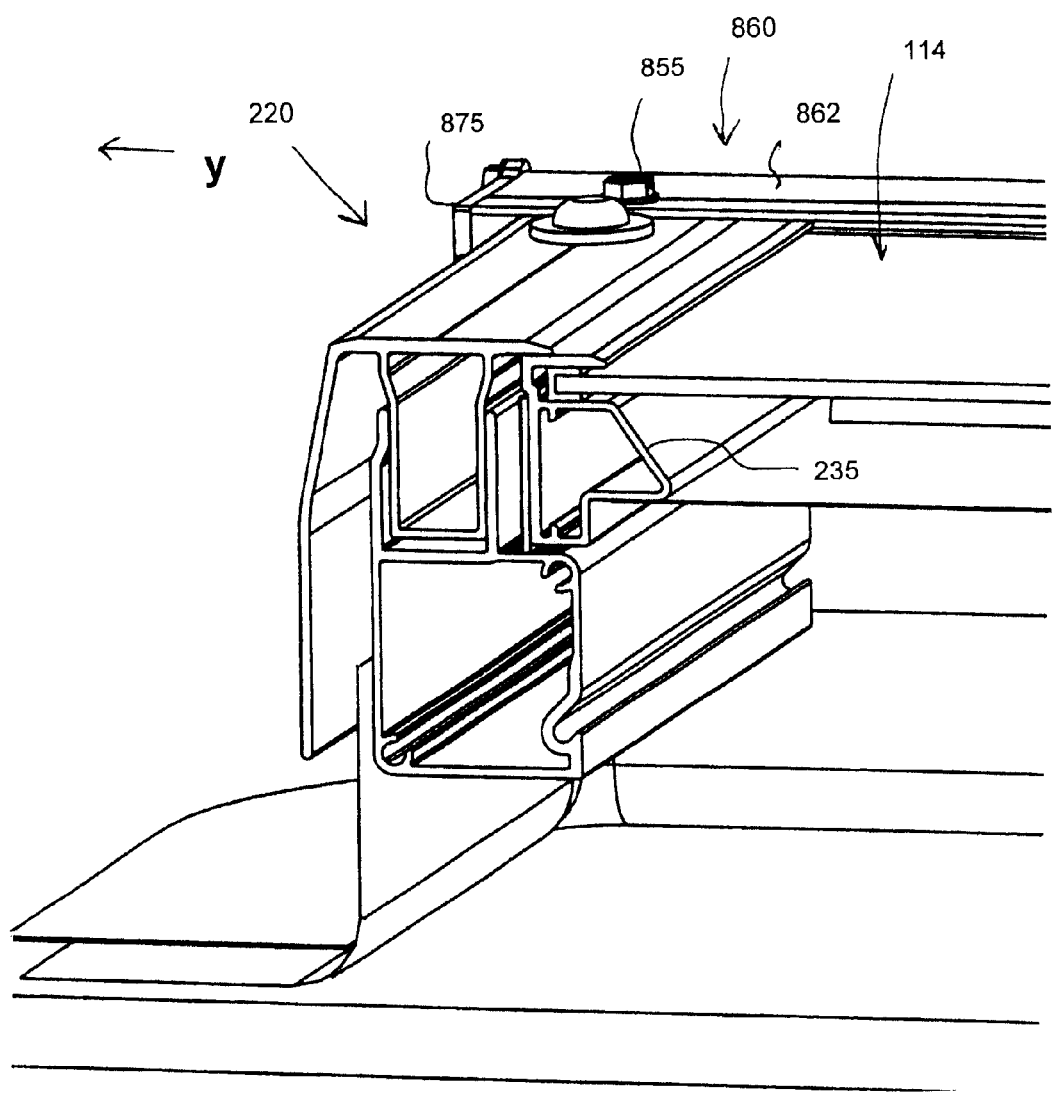
FIG. 8A is an isometric cross-sectional view of a rack assembly at a first corner of the overall perimeter, from a perspective of a free rail structures 220, under an embodiment of the invention.
Figure 8B:
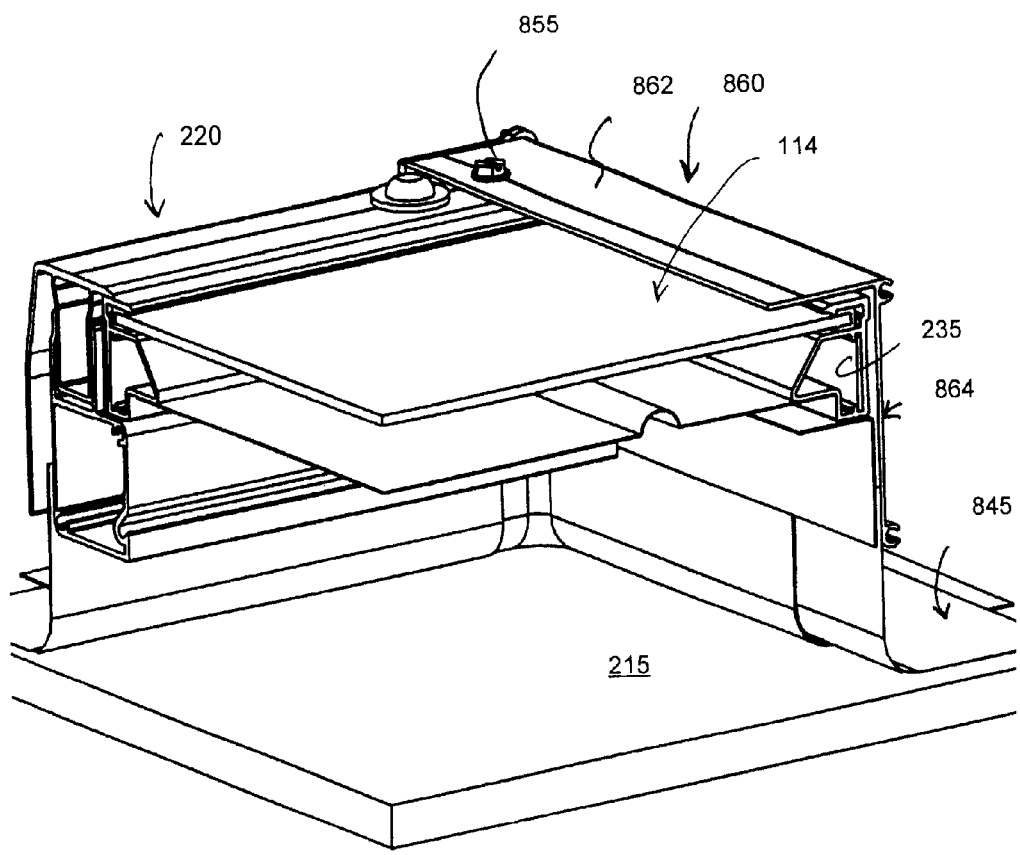
FIG. 8B is an isometric cross-sectional view of the rack assembly at a first corner of the overall perimeter, from a perspective of one of the shared rail structure, according to an embodiment of the invention

FIG. 8A is an isometric cross-sectional view of the rack assembly at a first corner of the overall perimeter, from a perspective of one of the free rail structures 220, under an embodiment of the invention. As shown, the free rail structure 220 extends along the perimeter and terminates at an end segment. The end segment may include a cap strip 860 having a horizontal segment 862 and a vertical segment 864 (FIG. 8B). A compression mechanism may force the cap strip 860 to stay fixed with respect to the solar module 114. In FIG. 8A and FIG. 8B, the appearance and construction of the solar module may differ because it illustrates solar modules that are thermal modules, as opposed to photovoltaic in nature (as described elsewhere in this application). In one embodiment, installation of the cap strip 860 follows installation of the remainder of the rack assembly 110 (FIG. 2A and FIG. 2B). When the remainder of the rack assembly 110 is affixed, a compression screw 855 is placed through an opening of the horizontal segment 862 to direct the cap strip into a fixed position relative to the free rail structure 220.

In an embodiment, an end cap 875 may be used to enclose the open end of the cap strip 860 to shield the mating surface of the free rail structure 220 and cap strip 860 from the entry of precipitation. A screw boss 858 (FIG. 8B) of the cap strip 860 may provide an opening for insertion of a fastener to maintain the end cap 875 in place.

FIG. 8B is an isometric cross-sectional view of the rack assembly at a first corner of the overall perimeter, from a perspective of one of the shared rail structure 240, under an embodiment of the invention. As shown, the horizontal segment 862 of the cap strip 860 is secured over the frame 235 of the solar module 114. The compression bolt 855 secures the cap strip 860 onto the free rail structure 220, so as to overlay the free rail structure 220 and shared rail structure 240 (not shown).

FIG. 8B illustrates that in an implementation in which the length provided by the cap strip 860 is to be sealed, an embodiment provides that a combination of flashing components may be used. As with the free rail structure 220, an embodiment may provide for a flashing and counter-flashing combination to enable the cap strip 860 to be sealed over the underlying body. The seal may promote formation of channels that hear air drawn from the environment or other source.

According to an embodiment, the counter-flashing combination may include a lower flashing component 845 that overlays, embeds or otherwise seals onto or against the underlying body 215. The lower flashing component 845 may bend from a horizontal segment provided over the underlying body into to upright position just beneath the cap strip 860. The cap strip 860 overlays the lower flashing component 845 with its horizontal segment 862 from the top, and its vertical segment from behind, so that the two components form the flashing and counter-flashing combination.

According to an further possible embodiment, an intermediary sealing shelf 880 may be utilized to assist the sealing on the end segments. Depending on the tolerances used in the construction of the rack assembly 110, a gap may be formed between the module frame 235 and flashing component 845, which is effectively bridged by the sealing shelf 880. Although the sealing shelf 880 is shown as a separate element, it may be incorporated as a unitary feature on the solar modules 114 or members of the rack assembly 110.

Thermal Modules

As mentioned with embodiments such as described with FIG. 2A and FIG. 2B, solar modules 114 can refer to either modules that primarily generate electricity or heat. When solar modules are designed to primarily generate heat, but not electricity, such modules are referred to as thermal modules. Thermal modules may be constructed to include features and components that are different than photovoltaic modules. As such, the thermal modules have different dimension (thickness in particular) and structure, unless such panels are altered during installation.

In order to accommodate thermal modules with photovoltaic modules, one embodiment provides that the thermal modules are made adjustable in thickness ("effective thickness") to match the configuration of the rack assembly for accommodating the thickness and structural variations of the photovoltaic modules. Accordingly, one or more embodiments provide for the use of thermal modules on a rack assembly that also includes photovoltaic modules. According to one embodiment, the rack assembly 110 (FIG. 2A and FIG. 2B) can include solar modules 114 that provide photovoltaic or thermal properties. As will be described, the different solar modules have different dimensions and structural features, and as such, require different settings and/or adaptations from retention features 245, 265 (FIG. 3A and FIG. 3B) that grasp the respective modules. For example, the retention features 245, 265 may be adjustable to alter a dimension for gripping solar modules after the given height in which the modules are to be raised from the underlying body has been set. Among other uses and benefits, embodiments of the invention enable the rack assembly 110 to accommodate and grasp different kinds of solar modules 114 through adjustments to rail structures and other members that retain such solar modules. Additionally, solar modules may be made to be adjustable in their effective thickness to enable the rack assembly to be uniformly configured for all solar modules.

Figure 9A:
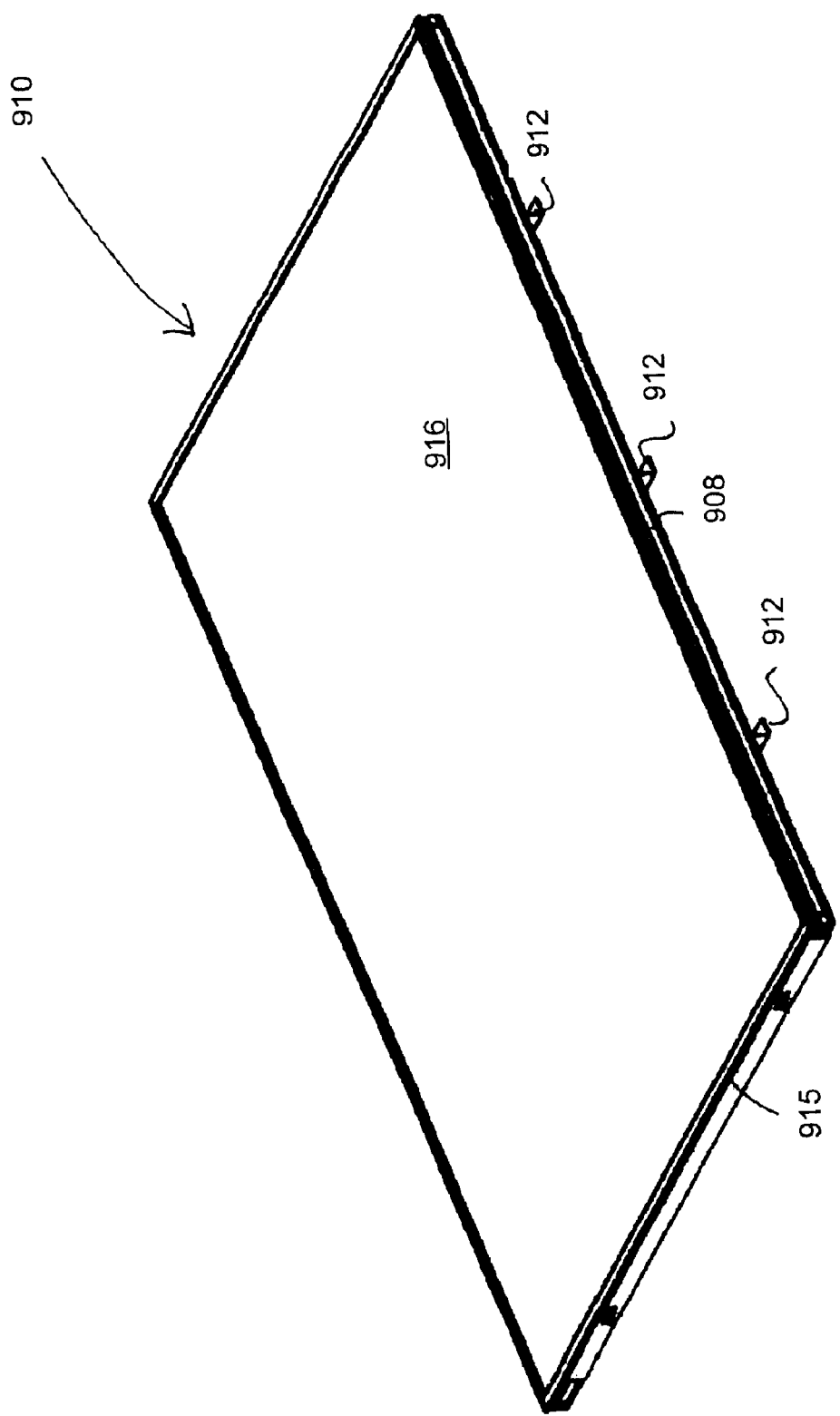
FIG. 9A is top isometric view of a thermal solar panel for use with a rack assembly, under an embodiment of the invention.

FIG. 9A is top isometric view of a thermal solar panel 910, according to an embodiment. The thermal solar panel 910 may correspond to or form part of one of the solar modules 114 provided on the rack assembly 110, such as shown in FIG. 2A and FIG. 2B. Accordingly, the thermal solar panel 910 may include a translucent or clear material layer 916, such as a glass sheet or other clear structure to receive solar rays. A shim plate 915 is provided on one or more lateral sides of the solar panel 910. As will be described, the shim plate 915 enables adjustment of the rack assembly 110 and positioning of the solar module 114 on which the thermal panel 910 is provided. A frame-wall 908 and spaced ribs 912 provide structural support for the thermal panel 910.

Figure 9B:
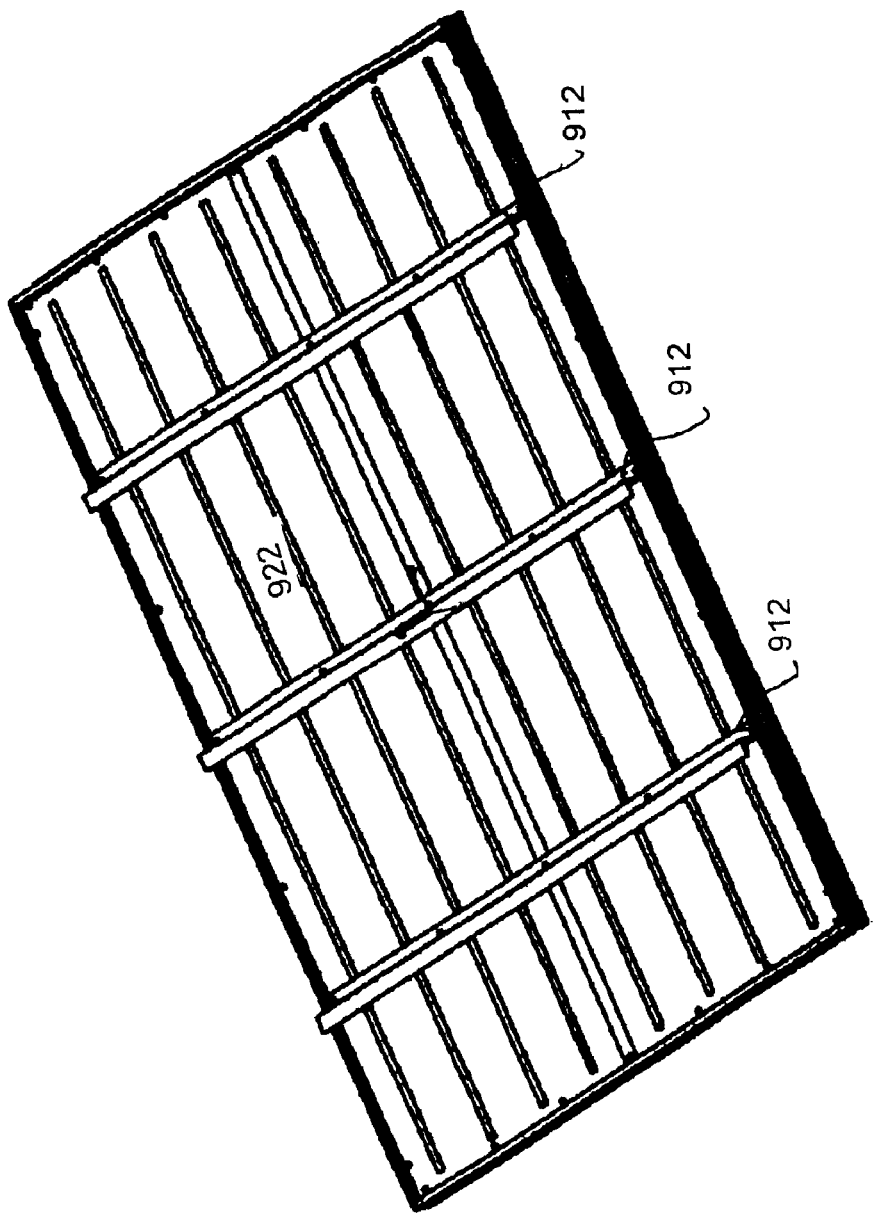
FIG. 9B is an isometric view of the thermal solar panel shown in FIG. 9A, under an embodiment of the invention.

FIG. 9B is an isometric view of the thermal solar panel 910, with the clear material layer 916 (FIG. 9A) removed, under an embodiment of the invention. An absorption layer 922 is provided underneath the material layer 916 to absorb solar energy from rays that pass through the material layer. The absorption layer 922 may be designed to promote absorption, through use of material and coloring. In one embodiment, the absorption layer 922 is formed from a metal, such as aluminum or copper, and painted black.

Figure 9C:
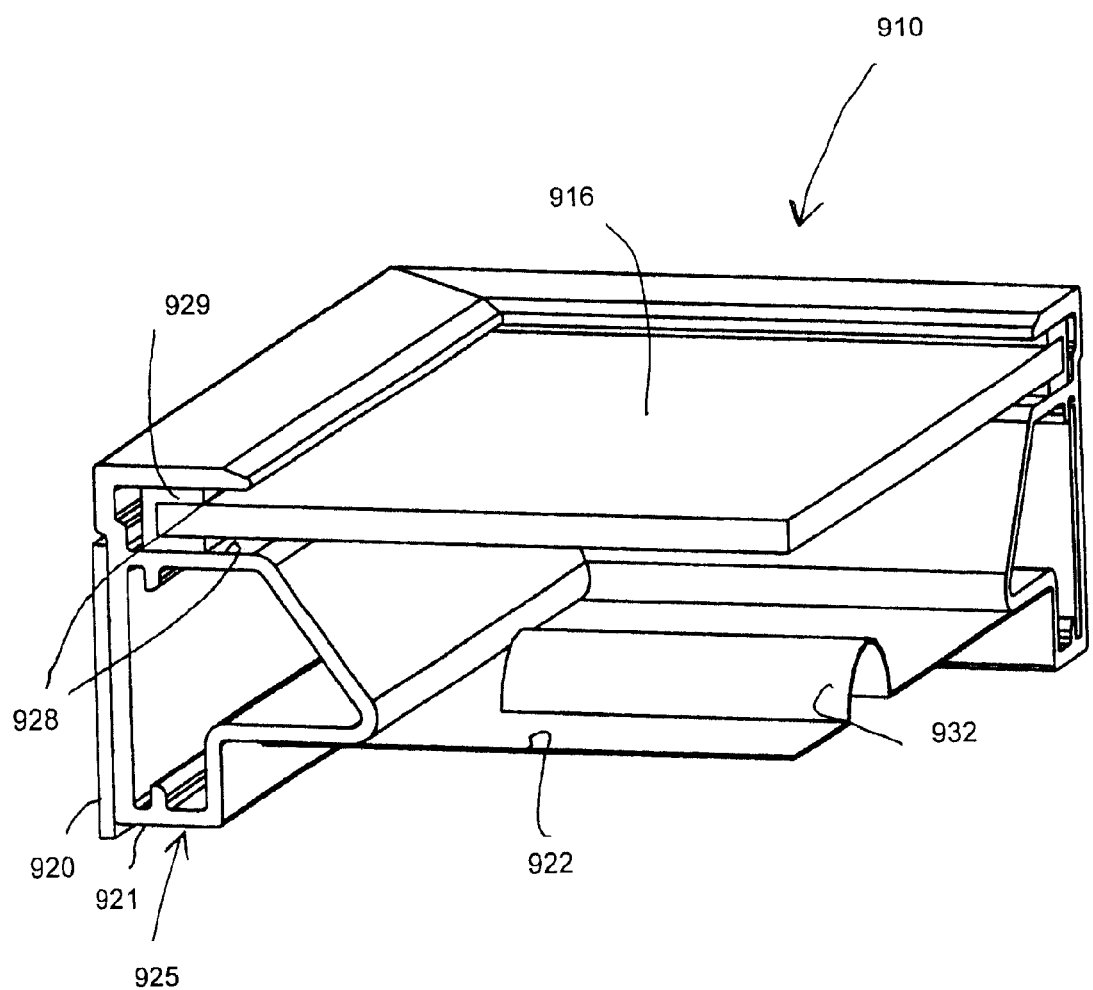
FIG. 9C is a cross-sectional isometric view of the thermal panel shown in FIGS. 9A and 9B, under an embodiment of the invention.

FIG. 9C is a cross-sectional isometric view of the thermal panel 910, under an embodiment. The thermal panel 910 includes a frame 935, which forms a perimeter of the material layer 916 and the absorption layer 922. The frame 935 includes a grasp 928 that retains the clear material layer 916. Deformable or protective spacers 929 may be provided within the grasp 928 to cushion the clear material layer 916 while it is held in position. In one implementation, the absorption layer 922 may include upturns 932 for added surface area and support.

In an embodiment, the thermal panel 910 includes a shim plate 915 that enables the panel to be included in the rack assembly in which other solar modules of other thicknesses are provided. The shim plate 915 may be moved vertically to increase or decrease the effective height of the thermal panel 910. In one implementation, the effective thickness is increased when the shim plate 915 that may be adjusted to protrude from the base 921 of the thermal panel. When the shim plate 915 is raised to be flushed, the effective thickness is at its minimum. As such, the thickness of the thermal panel 910 may be adjusted so that the effective thickness (as provided by the shim plate 915) matches, or substantially matches the thickness of other solar modules. For example, the thickness of the thermal panel 910 may be within 20% of the thickness of the solar modules 114 through vertical adjustment of the shim plate 915, while without the adjustment, the thickness would be off by more that 80%. The lesser the difference between the thickness of the thermal panel 910 and other solar modules 114, the better the seal and resulting air channels that can be formed under the rack assembly. Further, the uniform thickness provides a better assembled structure that is more stable, less likely to be under stress, and more aesthetic.

Figure 9D:
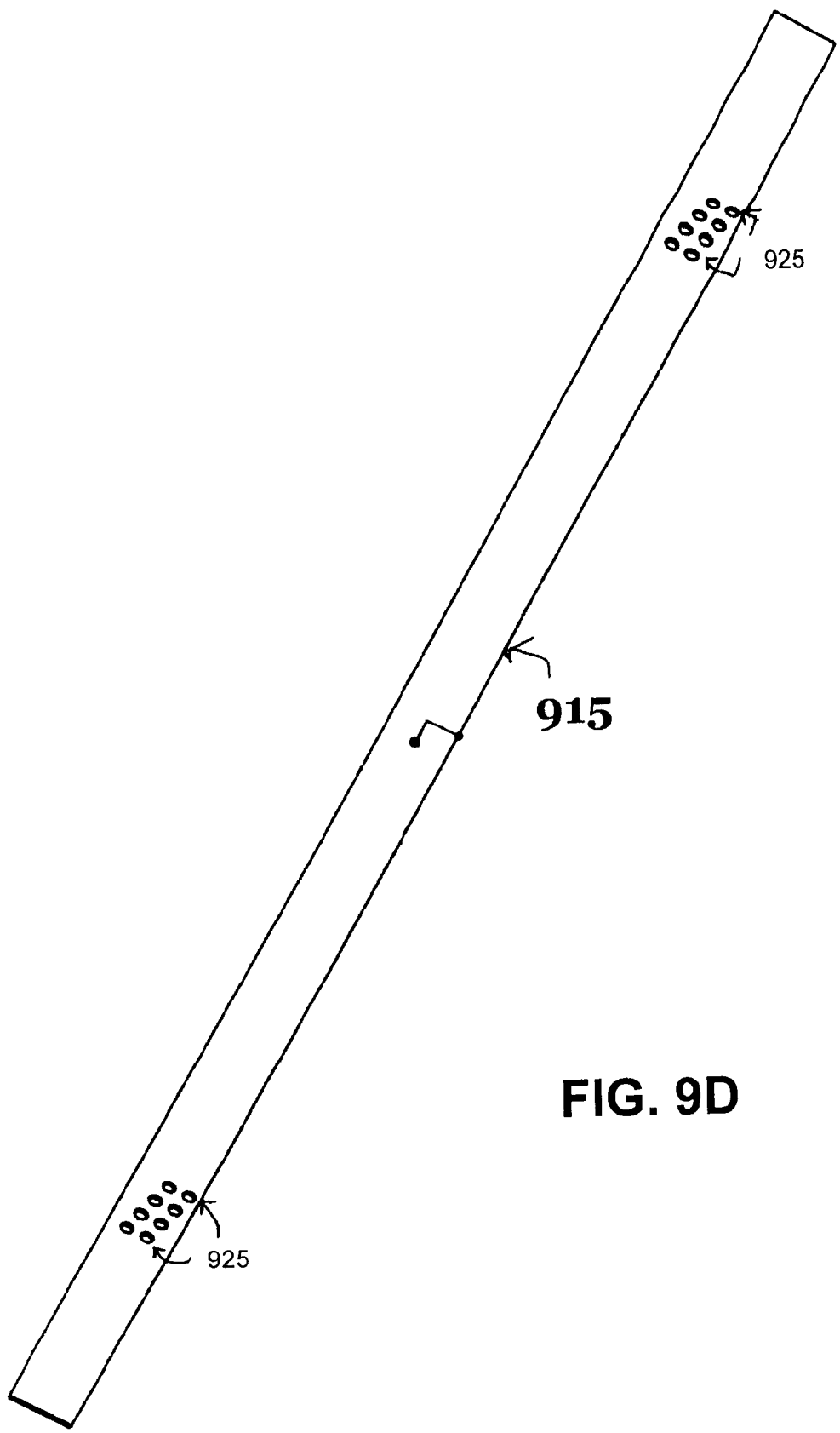
FIG. 9D illustrates a shim plate for use with a thermal solar panel such as shown and described, under an embodiment of the invention.

FIG. 9D illustrates the shim plate 915. The shim plate 915 may correspond to a flat rigid bar, such as formed by aluminum, having sets of connectivity apertures 925, 925. The connectivity apertures 925 maybe provided in pairs 926, with each pair being at a different vertical position on the shim plate 915. The different vertical positions of the pairs 926 enable variation in the protrusion of the shim plate 915 from the base 921 (FIG. 9C) of the thermal panel 910. At the time of installation, the installer can select the pair that results in the desired amount of protrusion. For example, the lowest vertical pair may result in shim plate 915 having no protrusion and the thermal panel 910 having minimum thickness, while the highest vertical pair results in the shim plate 915 having maximum protrusion and the thermal panel 910 having maximum thickness.

Figure 9E:
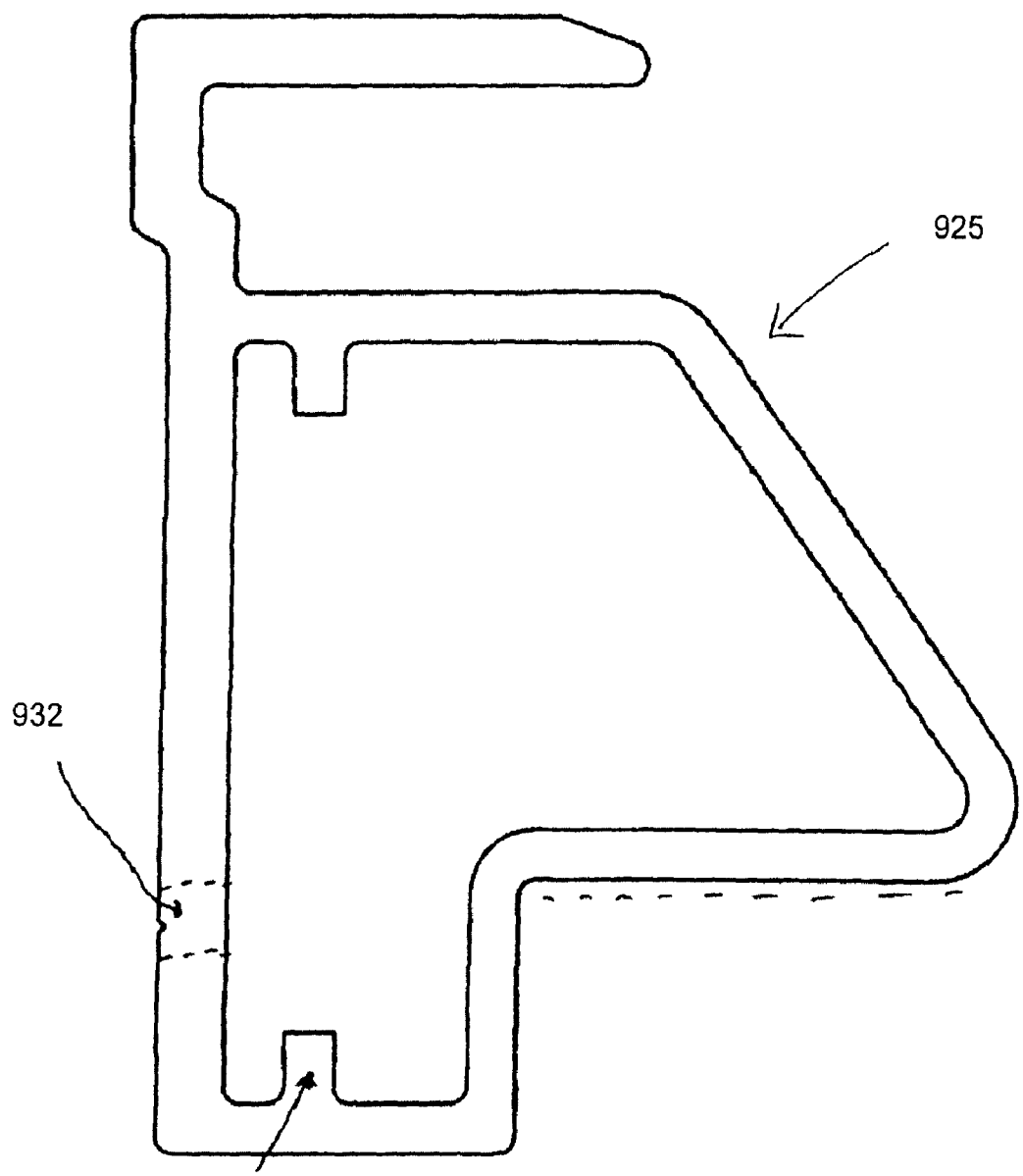
FIG. 9E illustrates a frame of a thermal panel such as shown and described, with a set of apertures for receiving a fastener inserted through the shim plate, under an embodiment of the invention.

FIG. 9E illustrates the frame 935 of the thermal panel 910, with a set of apertures 932 for receiving a fastener inserted through the shim plate 915.

Heat Exchange Systems

One or more embodiments described herein enable the rack assembly 10 (FIG. 1) to be used as a heat exchanged, for warming and driving air underneath the assembly. Numerous types of heat exchange systems may be implemented with a rack assembly that is configured according to an embodiment described herein. For example, as shown in FIG. 2A, the rack assembly 110 may include both thermal panels (such as described with FIG. 9A-9E) and photovoltaic panels. As an example, while the photovoltaic panels may by themselves generate sufficient heat to warm air driven under the rack assembly 110, use of thermal panels 910 in combination with photovoltaic panels enables significantly more heat to be generated, so that even in cold environments, sufficient heat is created to warm a dwelling that is tied to a duct system receiving air from the channels of the rack assembly.

While embodiments described above contemplate use of the heat to warm ducted or channeled air, other embodiments contemplate other uses and/or benefits for heat generated from the rack assemblies. For example, heat generated underneath the rack assembly 110 has the effect of cooling the solar modules, particularly the photovoltaic modules, and thus increasing the efficiency of their operations.

FIG. 10A illustrates an implementation in which the rack assembly 110 is provided over a series of vents 1010. In FIG. 10A, a series of vents 1010 is provided extending as a row under a corresponding row of solar modules 114.

FIG. 10B illustrates an underside of the rack assembly 110, as implemented in FIG. 10A. The vents 1010 may extend into a ducting system 1020 that transports heated air through a dwelling on which the rack assembly 110 is provided. Each vent 1010 may include a duct 1012 that feeds one or more main ducts 1015. According to one implementation, an air driver (not shown) such as a fan may draw the air through the duct system 1020 and, as such, from under the rack assembly 110.

As mentioned, different channel formations may be provided under the rack assembly 110. According to one or more embodiments, the channels may be formed by (i) sealed free rail structures 220, (ii) the underside of individual solar modules 114, and (iii) the underlying body on which the rack assembly is mounted. Numerous alternatives are possible, such as ducted structures that occupy, in whole or in part, open space under the rack assembly 110.

Figure 11A:
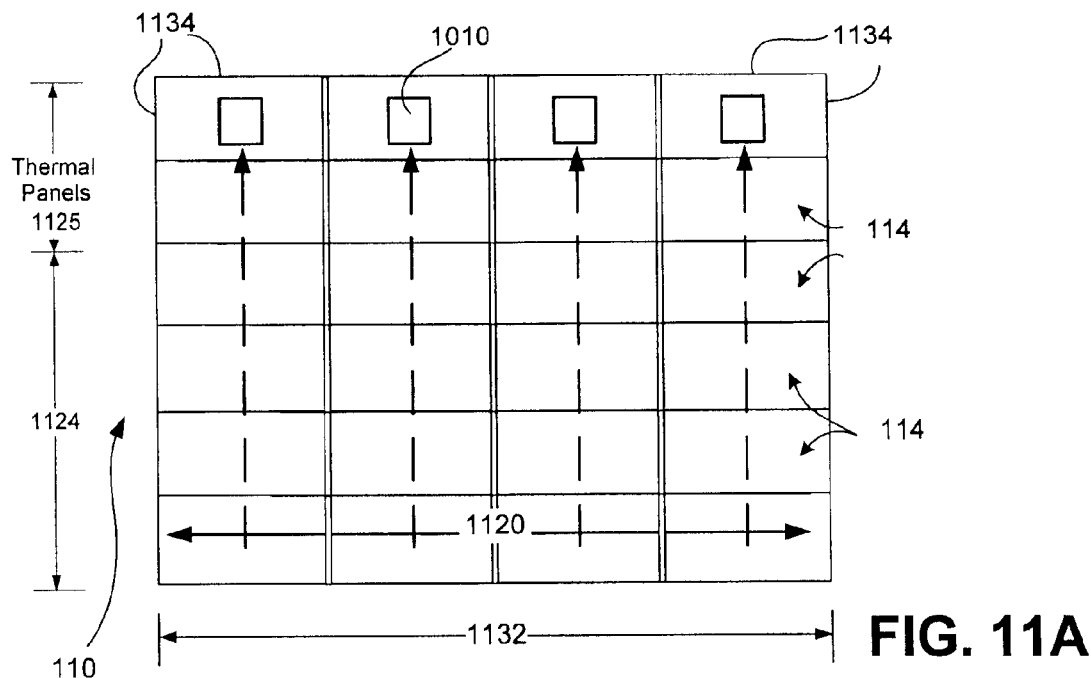
FIG. 11A shows a configuration in which a plurality of vents are aligned and provided under one row of a rack assembly on which a solar module array is installed, according to an embodiment of the invention.

FIG. 11A shows one configuration in which the plurality of vents 1010 are aligned and provided under one row of a solar module array installed with the rack assembly. Each vent 1010 may draw air from one of the perimeter lengths 1132 that is open. The other perimeter lengths 1134 may be closed and sealed over the underlying body. For example, flashing mechanisms, such as described with FIG. 4A and FIG. 8A and FIG. 8B. The result may be the formation of a general channel 1120 that extends from the open length 1132 to the plurality of vents 1010. In an implementation such as shown, the solar modules 114 are arranged to that incoming air is warmed by photovoltaic panels 1124, then by thermal panels 1125 as the air approaches the vents. A fan or other air driver may be tied or associated with the vent 1010 to draw the air from the open length 1132.

Figure 11B:
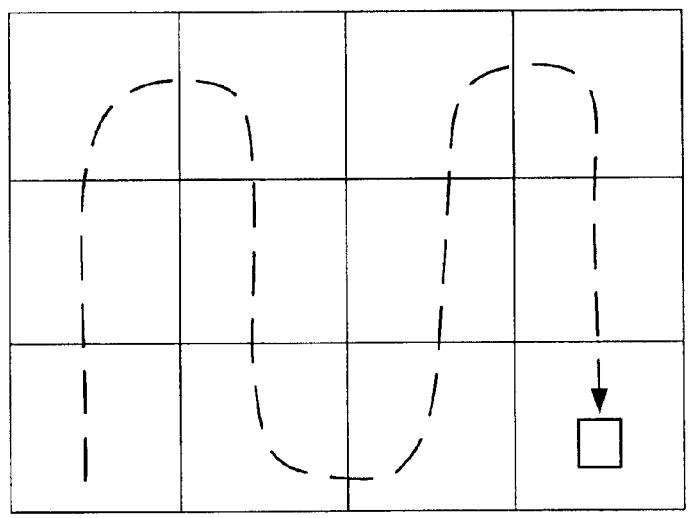
FIG. 11B shows the formation of an alternative configuration in which a multi-directional channel is formed below a rack assembly, according to an embodiment of the invention.
Figure 11B:
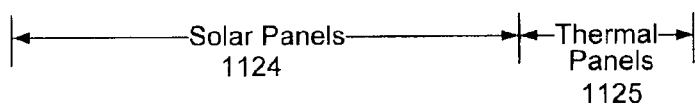

FIG. 11B shows the formation of an alternative configuration in which a multi-directional channel 1140 is formed below the rack assembly 1120. In an example provided, the open length 1132 may be smaller than the overall dimension of the perimeter, and the resulting channel 1140 may bend and turn. In a configuration shown, one vent 1010 is provided at the end of the channel 1140. Air flowing through the channel 1140 passes through photovoltaic panels 1124 before reaching the thermal panels 1125. In the example provided, the last column of solar modules 114 are thermal panels 1125, for more significant temperature increase to air already warmed by the photovoltaic panels 1124.

Although the embodiments described above provide a discrete set of configurations and implementations, embodiments of the invention are capable of a wide range of configurations and applications. While some of these various configurations and applications are discussed below they should not be construed as limiting the scope of the invention but as merely providing illustrations of some additional embodiments.

While one or more embodiments described above illustrate a configuration where intake air for the array is provided at a lower open edge and recovered at the sealed upper edge, other configurations are possible. One configuration may consist of a completely sealed perimeter with intake air taken from an internal environment such as the attic or rooms of a building to ventilate such spaces. Alternately, the rack assembly may be configured with the rail structures oriented laterally with the air intakes positioned on the left, right, or both left and right sides. In a further configuration the array may be configured with the perimeter edges open to uniformly admit intake air. In any of these or other potential configurations the design of the rack assembly is such that it allows the air channel under the array to be flexibly arranged through selective sealing of the perimeter edges.

Additionally, while an embodiment described above refer to an air driver used to push or pull air through the array, such a device need not be separate from the array. While a fan is one embodiment of an air driver, natural buoyancy flows created by the solar modules 114 is also an effective air driver. This buoyancy driven flow may be created by the heat the solar modules 114 provide to the air channels underneath the array. Such a configuration of an air driver allows the array to passively ventilate and may be useful in certain embodiments of the invention.

Although some embodiments described above generally refer to the thermal energy generated by the solar modules 114 as heat, this should be interpreted in the general thermodynamic sense as the transfer of thermal energy from the modules. While the array is receiving solar energy, there will be a positive transfer of heat from the solar modules 114 to the air flowing through the channels behind the array resulting in an increase in the air temperature. This higher temperature air can then be used for several uses ranging from heating a building space to crop or lumber drying. When the array is receiving little to no solar energy there may be negative heat transfer from the modules to the air flowing through the channels behind the array resulting in a decrease in air temperature. This lower temperature air can have several uses including flushing a building with cool ventilation air during a summer evening. Depending on the incident solar energy and ambient conditions the solar modules may be capable of increasing or decreasing the air temperature in the channel to provide both heating and cooling capabilities.

Additionally, while one or more embodiments described above generally refer to a construction of the rack assembly attached to a sub structure through fasteners, adhesives, or other positive means, other configurations are possible. In one possible embodiment the rack assembly is ballast mounted to the underlying body without positive means. Ballast mounting relies on a combination of friction and gravity forces to keep the rack assembly from separating or shifting along the underlying body. While not practicable in all configurations, the monolithic rack assembly achieved by the linkage of the rail assemblies by the strut runners provides an ideal rack assembly for ballast mounting.

Although an embodiment of the thermal insert described above consists of a single thermal absorber in contact with the air channel, other configurations are possible. One such configuration would consist of a secondary absorber suspended below the primary absorber described above. This secondary absorber provides an additional heat transfer surface that is in convective and radiative communication with the primary absorber and enhances the transfer of thermal energy from the absorber(s) to the air channel. This secondary absorber may take the form of a solid sheet, a perforated sheet, mesh or other suitable surface. Other configurations employing multiple secondary absorbers in various forms is also possible.

While an embodiments described above generally refer to a specific arrangement of the array employing a mix of both photovoltaic modules and thermal modules, other configurations are possible. One such configuration would be where the design goal of the array is solely the generation of thermal and not electrical energy. In such a case the rack assembly may consist entirely of thermal modules. Alternately, the design goal may be primarily for electrical energy with thermal energy as a by product. In such a case the rack assembly may consist entirely of photovoltaic modules. The design of the rack assembly enables a variety of configurations for both module styles and can be configured to suit a wide range of electrical and thermal outputs.

CONCLUSION

Although the descriptions above contain many specifics, these should not be construed as limiting the scope of the invention but as merely providing illustrations of some embodiments.

What is claimed is:

1. An assembly on which an array of solar modules are mounted on an inclined surface of an underlying body, the assembly comprising:
   a plurality of rail structures that are arrangeable over the underlying body to form an overall perimeter for the assembly, the plurality of rail structures being extendable along a gradient of the incline to provide an up-gradient perimeter and a down-gradient perimeter;
   one or more retention structures provided with the plurality of rail structures, wherein the retention structures are configured to support one or more of the plurality of solar modules at a given height above the underlying body;
   wherein at least some of the plurality of rail structures each include a flashing component that extends to the underlying body, wherein the plurality of rail structures and the flashing component combine to provide an open length along the down-gradient perimeter of the array, so as to enable air flow to enter a space formed under the array by the plurality of rail members, the air flow being constrained underneath the one or more solar modules; and
   wherein at least one of (i) one or more of the rail structures, or (ii) the one or more retention structures are adjustable so as to adapt the assembly to accommodate solar modules of varying forms or dimensions.

2. The assembly of claim 1, further comprising one or more coupling structures, wherein each of the one or more coupling structures enables at least a portion of one or more of the rail structures to be sealed over the underlying body.

3. The assembly of claim 1, wherein the flashing component of at least one of the plurality of rail structures includes an underlying component that extends into or against the underlying body.

4. The assembly of claim 1, wherein the flashing component of at least one of the plurality of rail structures includes an overlaying component that extends over the underlying flashing component.

5. The assembly of claim 1, further comprising one or more strut runners that extend directly over the underlying body and support the plurality of rail structures.

6. The assembly of claim 5, wherein at least one of (i) the one or more rail structures, or (ii) the one or more strut runners are adjustable when mounted onto the underlying body so as to enable the assembly to be flexibly fitted onto the underlying body.

7. The assembly of claim 1, further comprising a compression mechanism that is manipulated to compress the retention structures in order to cause the retention structures to grip a corresponding solar module and to provide the corresponding module in a fixed position.

8. An assembly for mounting an array of solar modules on an inclined surface of an underlying body, wherein the assembly is installed over the underlying body and comprises:
- a plurality of rail structures that are arranged to form an overall perimeter for the assembly, the plurality of rail structures being extendable along a gradient of the incline to provide an up-gradient perimeter and a down-gradient perimeter;
- one or more retention structures provided with the plurality of rail structures to support one or more of the plurality of solar modules mounted thereon at a given height over the underlying body; and
- a channel that constrains air flow, the channel being formed at least in part by a flashing component included in each of the plurality of rail structures along the down-gradient perimeter of the array so as to enable the air flow to enter a space formed under the array by the plurality of rail members, the channel occupying at least a portion of the given height separating the one or more solar modules from the underlying structure.

9. The assembly of claim 8, wherein the channel is formed at least in part by at least some of the plurality of rail structures, and wherein the channel includes an opening for the exchange of air with an environment of the assembly; and
wherein the channel is oriented to have one or more openings to receive airflow entering from at least one or more of the openings.

10. The assembly of claim 8, wherein at least one of (i) one or more of the rail structures, or (ii) the one or more retention structures are adjustable so as to adapt the assembly to accommodate solar modules of varying forms or dimensions.

11. The assembly of claim 8, further comprising one or more sealing features provided with the plurality of rail structures, wherein the one or more sealing features enable the individual rail structure to be sealed over the underlying body to constrain the airflow so as to form at least a portion of the channel.

12. The assembly of claim 8, wherein the flashing component forms at least a part of the channel and includes an underlying component that extends into or against the underlying body.

13. The assembly of claim 8, wherein the flashing component forms at least a part of the channel and includes an overlaying component that extends over the underlying flashing component.

14. The assembly of claim 8, further comprising one or more strut runners that extend directly over the underlying body and support the plurality of rail structures.

15. The assembly of claim 14, wherein at least one of (i) the one or more rail structures, or (ii) the one or more strut runners are adjustable when mounted onto the underlying body so as to enable the assembly to be flexibly fitted onto the underlying body.

16. The assembly of claim 11, wherein an overall perimeter of the assembly is rectangular, and wherein a portion of the overall perimeter is sealed with the underlying body and includes a majority of three lengths of the rectangle, and wherein the opening is provided at a remaining portion of the overall perimeter.

17. The assembly of claim 8, further comprising a compression mechanism that is manipulated to compress the retention structures in order to cause the retention structures to grip a corresponding solar module and to provide the corresponding module in a fixed position.

18. The assembly of claim 17, wherein one or more of the plurality of rail structures include an interior surface from which one or more corresponding retention structures are provided, and wherein each of the one or more rail structures is provided a shim plate on an exterior surface that forms the portion of the overall perimeter so as to support that rail structure when compressed by the compression mechanism.

* * * * *